United States Patent
Hsueh et al.

(10) Patent No.: US 9,341,815 B1
(45) Date of Patent: May 17, 2016

(54) OPTICAL IMAGING SYSTEM, IMAGE CAPTURING UNIT AND ELECTRONIC DEVICE

(71) Applicant: LARGAN Precision Co., Ltd., Taichung (TW)

(72) Inventors: Chun-Che Hsueh, Taichung (TW); Chun-Yen Chen, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/625,043

(22) Filed: Feb. 18, 2015

(30) Foreign Application Priority Data

Jan. 7, 2015 (TW) .............................. 104100438 A

(51) Int. Cl.
| | |
|---|---|
| *G02B 13/00* | (2006.01) |
| *G02B 9/12* | (2006.01) |
| *G02B 5/20* | (2006.01) |
| *H04N 5/225* | (2006.01) |
| *H04N 5/232* | (2006.01) |

(52) U.S. Cl.
CPC ............ *G02B 13/0035* (2013.01); *G02B 5/208* (2013.01); *G02B 9/12* (2013.01); *G02B 13/008* (2013.01); *H04N 5/2253* (2013.01); *H04N 5/23212* (2013.01)

(58) Field of Classification Search
None
See application file for complete search history.

(56) References Cited

U.S. PATENT DOCUMENTS

| | | | |
|---|---|---|---|
| 6,970,306 B2 | 11/2005 | Matsuo | |
| 7,031,079 B2 * | 4/2006 | Isono | G02B 13/0035 359/716 |
| 7,167,323 B2 | 1/2007 | Isono | |

(Continued)

FOREIGN PATENT DOCUMENTS

| | | |
|---|---|---|
| CN | 103185951 A | 7/2013 |
| JP | 2004252312 | 9/2004 |

(Continued)

OTHER PUBLICATIONS

Intellectual Property Office, Ministry of Economic Affairs, R. O. C, "Office Action",Oct. 7, 2015, Taiwan.

*Primary Examiner* — Ahmed A Berhan
(74) *Attorney, Agent, or Firm* — Locke Lord LLP; Tim Tingkang Xia, Esq.

(57) ABSTRACT

An optical imaging system includes, in order from an object side to an image side, a first lens element, a second lens element and a third lens element. The first lens element with positive refractive power has an object-side surface being convex and an image-side surface being convex in a paraxial region. The second lens element with positive refractive power has an object-side surface being concave and an image-side surface being convex in a paraxial region. The third lens element with negative refractive power has an image-side surface being concave in a paraxial region thereof, wherein the image-side surface of the third lens element has at least one convex shape in an off-axis region thereof. The optical imaging system further comprises a stop between the image-side surface of the first lens element and the object-side surface of the second lens element. The lens elements are made of plastic material.

25 Claims, 22 Drawing Sheets

(56) References Cited

U.S. PATENT DOCUMENTS

| | | | |
|---|---|---|---|
| 7,304,807 B2 | 12/2007 | Isono | |
| 7,679,841 B2 * | 3/2010 | Chen | G02B 9/12 359/708 |
| 7,706,086 B2 | 4/2010 | Noda | |
| 7,742,238 B2 * | 6/2010 | Sato | G02B 13/0035 359/708 |
| 8,369,009 B2 | 2/2013 | Lin et al. | |
| 2009/0207507 A1 | 8/2009 | Shinohara | |
| 2015/0029600 A1 | 1/2015 | Kim et al. | |

FOREIGN PATENT DOCUMENTS

| | | |
|---|---|---|
| JP | 2007127960 | 5/2007 |
| JP | 2008020513 A | 1/2008 |
| JP | 2012108230 A | 6/2012 |
| JP | 2015169688 A | 9/2015 |
| TW | 201300826 A | 1/2013 |
| TW | 201405161 A | 2/2014 |
| WO | 2012035708 A1 | 3/2012 |
| WO | 2012114970 A1 | 8/2012 |

* cited by examiner

OPTICAL IMAGING SYSTEM, IMAGE CAPTURING UNIT AND ELECTRONIC DEVICE

RELATED APPLICATIONS

This application claims priority to Taiwan Application 104100438, filed Jan. 7, 2015, which is incorporated by reference herein in its entirety.

BACKGROUND

1. Technical Field

The present disclosure relates to an optical imaging system, an image capturing unit and an electronic device, more particularly to an optical imaging system and an image capturing unit applicable to an electronic device.

2. Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a two-element lens structure. Due to the popularity of mobile terminals with high-end specifications, such as smart phones, tablet personal computers, wearable apparatus and infrared camera, the requirements for high resolution and image quality of present compact optical systems increase significantly. However, the conventional optical systems cannot satisfy these requirements of the compact optical systems.

Other conventional compact optical systems with three-element lens structure are developed to enhance resolution and image quality. However, the refractive power of the optical system is unevenly distributed so that it is unfavorable for reducing the back focal length of the optical system, and therefore it is unfavorable for keeping the optical system compact. Furthermore, the unevenly distributed refractive power is easily overloaded on a single lens element so that it is unfavorable for correcting the aberration and reducing the sensitivity of the optical system.

SUMMARY

According to one aspect of the present disclosure, an optical imaging system includes, in order from an object side to an image side, a first lens element, a second lens element and a third lens element. The first lens element with positive refractive power has an object-side surface being convex in a paraxial region thereof and an image-side surface being convex in a paraxial region thereof, wherein both of the object-side surface and the image-side surface of the first lens element are aspheric, and the first lens element is made of plastic material. The second lens element with positive refractive power has an object-side surface being concave in a paraxial region thereof and an image-side surface being convex in a paraxial region thereof, wherein both of the object-side surface and the image-side surface of the second lens element are aspheric, and the second lens element is made of plastic material. The third lens element with negative refractive power has an image-side surface being concave in a paraxial region thereof, wherein the image-side surface of the third lens element has at least one convex shape in an off-axis region thereof, both of an object-side surface and the image-side surface of the third lens element are aspheric, and the third lens element is made of plastic material. The optical imaging system has a total of three lens elements with refractive power which are the first lens element, the second lens element and the third lens element. The optical imaging system further comprises a stop located between the image-side surface of the first lens element and the object-side surface of the second lens element. When a focal length of the first lens element is f1, a focal length of the second lens element is f2, a focal length of the third lens element is f3, a central thickness of the first lens element is CT1, a central thickness of the third lens element is CT3, an axial distance between the stop and the image-side surface of the third lens element is SD, an axial distance between the object-side surface of the first lens element and the image-side surface of the third lens element is TD, the following conditions are satisfied:

$$|f3|<f2<f1;$$

$$1.55<CT1/CT3;\ \text{and}$$

$$0.55<SD/TD<0.80.$$

According to another aspect of the present disclosure, an optical imaging system includes, in order from an object side to an image side, a first lens element, a second lens element and a third lens element. The first lens element with positive refractive power has an object-side surface being convex in a paraxial region thereof and an image-side surface being convex in a paraxial region thereof, wherein both of the object-side surface and the image-side surface of the first lens element are aspheric, and the first lens element is made of plastic material. The second lens element with positive refractive power has an object-side surface being concave in a paraxial region thereof and an image-side surface being convex in a paraxial region thereof, wherein both of the object-side surface and the image-side surface of the second lens element are aspheric, and the second lens element is made of plastic material. The third lens element with negative refractive power has an image-side surface being concave in a paraxial region thereof, wherein the image-side surface of the third lens element has at least one convex shape in an off-axis region thereof, both of an object-side surface and the image-side surface of the third lens element are aspheric, and the third lens element is made of plastic material. The optical imaging system has a total of three lens elements with refractive power which are the first lens element, the second lens element and the third lens element. The optical imaging system further comprises a filter. At least one of the first lens element, the second lens element, the third lens element and the filter is made of visible-light-absorbing material. When a focal length of the first lens element is f1, a focal length of the second lens element is f2, a focal length of the third lens element is f3, a central thickness of the first lens element is CT1, a central thickness of the third lens element is CT3, the following conditions are satisfied:

$$|f3|<f2<f1;\ \text{and}$$

$$1.25<CT1/CT3.$$

According to still another aspect of the present disclosure, an image capturing unit includes an image sensor and the aforementioned optical imaging system, wherein the image sensor is disposed on the image side of the optical imaging system.

According to yet another aspect of the present disclosure, an electronic device includes the aforementioned image capturing unit.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
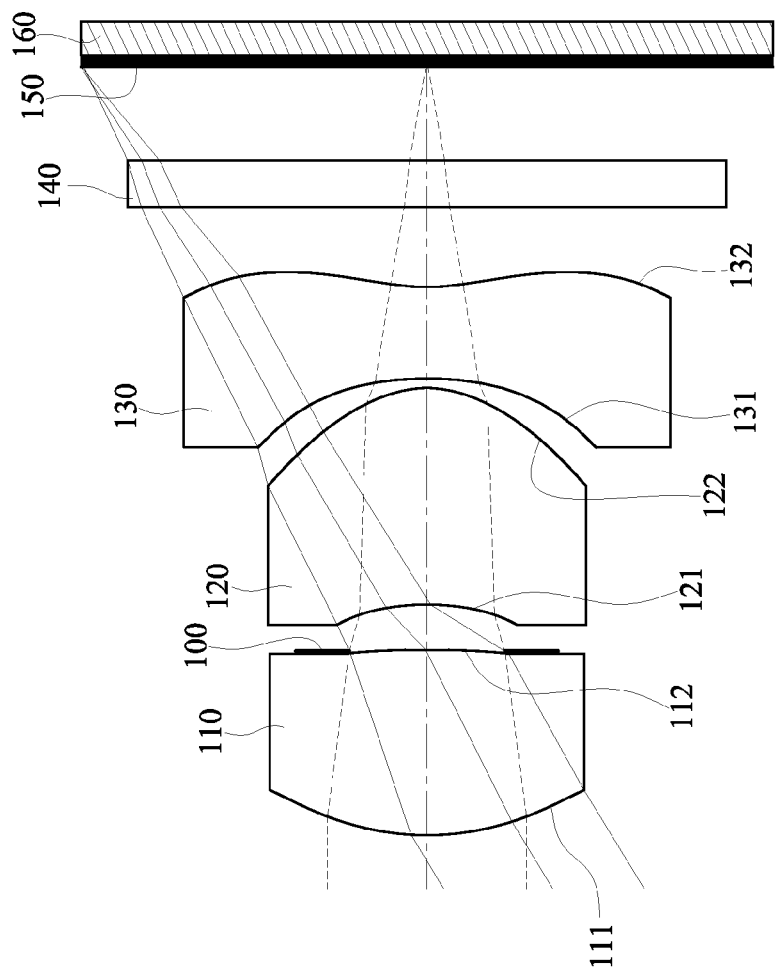
FIG. 1 is a schematic view of an image capturing unit according to the 1st embodiment of the present disclosure.

An optical imaging system includes, in order from an object side to an image side, a first lens element, a second lens element and a third lens element. The optical imaging system has a total of three lens elements with refractive power.

The first lens element with positive refractive power has an object-side surface being convex in a paraxial region thereof and an image-side surface being convex in a paraxial region thereof. Therefore, the first lens element provides the optical imaging system with sufficient positive refractive power, and it is favorable for properly adjusting a total track length of the optical imaging system. Furthermore, both the object-side surface and the image-side surface of the first lens element are convex in the paraxial region thereof so that it is favorable for effectively balancing the arrangement of the curvature of the first lens element, thereby it is favorable for preventing the object-side surface and the image-side surface of the first lens element from overly curved so as to avoid excessive aberration and reduce molding problems.

The second lens element with positive refractive power has an object-side surface being concave in a paraxial region thereof and an image-side surface being convex in a paraxial region thereof. Therefore, both the first lens element and the second lens element have positive refractive powers so that it is favorable for evenly distributing the refractive power of the optical imaging system so as to reduce the sensitivity of the optical imaging system. Furthermore, it is favorable for reducing a back focal length of the optical imaging system so as to keep the optical imaging system compact.

The third lens element with negative refractive power can have an object-side surface being concave in a paraxial region thereof. The third lens element has an image-side surface being concave in a paraxial region thereof. The image-side surface of the third lens element has at least one convex shape in an off-axis region thereof. Therefore, the first lens element with positive refractive power, the second lens element with positive refractive power and the third lens element with negative refractive power together form a structure with positive-positive-negative lens elements. When the refractive power of the third lens element is stronger than that of the first lens element and that of the second lens element, the structure with positive-positive-negative lens elements is favorable for reducing the total track length and the back focal length of the optical imaging system. Furthermore, it is favorable for effectively reducing the incident angle of the light projecting onto the image sensor so as to improve the image-sensing efficiency of the image sensor and further correcting the aberration of the off-axis region.

When a focal length of the first lens element is f1, a focal length of the second lens element is f2, a focal length of the third lens element is f3, the following condition is satisfied: $|f3|<f2<f1$. Therefore, it is favorable for balancing the arrangement of the refractive powers of the lens elements so as to correct the aberration of the optical imaging system and reduce the sensitivity of the optical imaging system.

When a central thickness of the first lens element is CT1, a central thickness of the third lens element is CT3, the following condition is satisfied: $1.25<CT1/CT3$. Therefore, the thicknesses of the first lens element and the third lens element are properly distributed so that it is favorable for preventing the lens elements from unfavorable molding problems, thereby the thicknesses of the lens elements are more homogeneous. Preferably, the following condition is satisfied:

$1.80 < CT1/CT3 < 4.50$. More preferably, the following condition is satisfied: $2.40 < CT1/CT3 < 3.50$.

When an axial distance between a stop and the image-side surface of the third lens element is SD, an axial distance between the object-side surface of the first lens element and the image-side surface of the third lens element is TD, the following condition is satisfied: $0.55 < SD/TD < 0.80$. Therefore, it is favorable for obtaining a balance between the telecentric and the wide-angle characteristics.

When an axial distance between the first lens element and the second lens element is T12, an axial distance between the second lens element and the third lens element is T23, the following condition can be satisfied: $2.5 < T12/T23$. Therefore, it is favorable for properly arranging the axial distances between two adjacent lens elements so as to reduce the total track length of the optical imaging system, thereby keeping in a compact size thereof.

When a sum of central thicknesses of the first lens element through the third lens element is ΣCT (that is, a sum of central thicknesses of the first lens element, the second lens element and the third lens element), the central thickness of the first lens element is CT1, the following condition can be satisfied: $1.40 < \Sigma CT/CT1 < 2.60$. Therefore, it is favorable for providing the lens elements with proper thicknesses so as to keep the optical imaging system compact and increase the manufacturing yield rate.

When an Abbe number of the second lens element is V2, an Abbe number of the third lens element is V3, the following condition can be satisfied: $0.80 < V2/V3 < 1.33$. Therefore, it is favorable for choosing proper plastic material of the lens element so as to improve the image quality.

When the axial distance between the object-side surface of the first lens element and the image-side surface of the third lens element is TD, the following condition can be satisfied: $TD < 2.25$ millimeters (mm). Therefore, it is favorable for keeping the optical imaging system compact so as to be equipped in an electronic device.

When the Abbe number of the second lens element is V2, the Abbe number of the third lens element is V3, the following condition can be satisfied: $V2+V3 < 70$. Therefore, it is favorable for choosing proper plastic material of the lens element so as to improve the image quality.

When a refractive index of the second lens element is N2, a refractive index of the third lens element is N3, the following condition can be satisfied: $3.00 < N2+N3 < 3.40$. Therefore, the refractive indices of the second lens element and the third lens element are more proper so that it is favorable for correcting the aberration of the optical imaging system and improving the image quality.

When an axial distance between the object-side surface of the first lens element and an image surface is TL, an entrance pupil diameter of the optical imaging system is EPD, the following condition can be satisfied: $1.0 < TL/EPD < 3.4$. Therefore, it is favorable for providing sufficient amount of incident light so as to enhance the resolution in the low light condition.

When the focal length of the first lens element is f1, the focal length of the second lens element is f2, the focal length of the third lens element is f3, the following condition can be satisfied: $1.25 < (|f3|/f2)+(f2/f1) < 1.85$. Therefore, it is favorable for evenly distributing the refractive power of the optical imaging system so as to avoid excessive aberration and effectively reduce the sensitivity of the optical imaging system.

When the focal length of the first lens element is f1, a curvature radius of the image-side surface of the first lens element is R2, the following condition can be satisfied: $-1.5 < f1/R2 < 0$. Therefore, it is favorable for providing the image-side surface of the first lens element with proper curvature radius so as to reduce the total track length of the optical imaging system.

According to the optical imaging system of the present disclosure, the optical imaging system can be operated within a wavelength range of 750 nanometers (nm) to 1050 nm. Therefore, it is favorable for effectively capturing the images within infrared spectrum so as to be applied to motion sensing, low-light photography or iris recognition.

According to the optical imaging system of the present disclosure, the optical imaging system further comprises a filter. At least one of the first lens element, the second lens element, the third lens element and the filter can be made of visible-light-absorbing material for absorbing visible light. The light-absorbing material is, for example, a plastic material with blacken treatment. Therefore, the lens elements and the filter can be made of aforementioned visible-light-absorbing material so that it is favorable for effectively reducing the transmittance of visible light so as to avoid the visible light resulting in unfavorable influences on the image quality.

According to the optical imaging system of the present disclosure, an aperture stop can be configured as a middle stop. A middle stop disposed between the first lens element and the image surface is favorable for enlarging the field of view of the optical imaging system and thereby provides a wider field of view for the same.

According to the optical imaging system of the present disclosure, the lens elements thereof can be made of glass or plastic material. When the lens elements are made of glass material, the distribution of the refractive power of the optical imaging system may be more flexible to design. When the lens elements are made of plastic material, the manufacturing cost can be effectively reduced. Furthermore, surfaces of each lens element can be arranged to be aspheric or spherical. The aspheric surface of the lens element is easy to form a shape other than spherical surface so as to have more controllable variables for eliminating the aberration thereof, and to further decrease the required number of the lens elements. Therefore, the total track length of the optical imaging system can also be reduced.

According to the optical imaging system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the optical imaging system of the present disclosure, an image surface of the optical imaging system, based on the corresponding image sensor, can be flat or curved, especially a curved surface being concave facing towards the object side of the optical imaging system.

According to the optical imaging system of the present disclosure, the optical imaging system can include at least one stop, such as an aperture stop, a glare stop or a field stop. Said glare stop or said field stop is set for eliminating the stray light and thereby improving the image quality thereof.

According to the present disclosure, an image capturing unit is provided. The image capturing unit includes the optical imaging system according to the aforementioned optical imaging system of the present disclosure, and an image sensor, wherein the image sensor is disposed on the image side of the aforementioned optical imaging system, that is, the image sensor can be disposed on or near an image surface of the aforementioned optical imaging system. In some embodiments, the image capturing unit can further include a barrel member, a holding member or a combination thereof.

Figure 23:
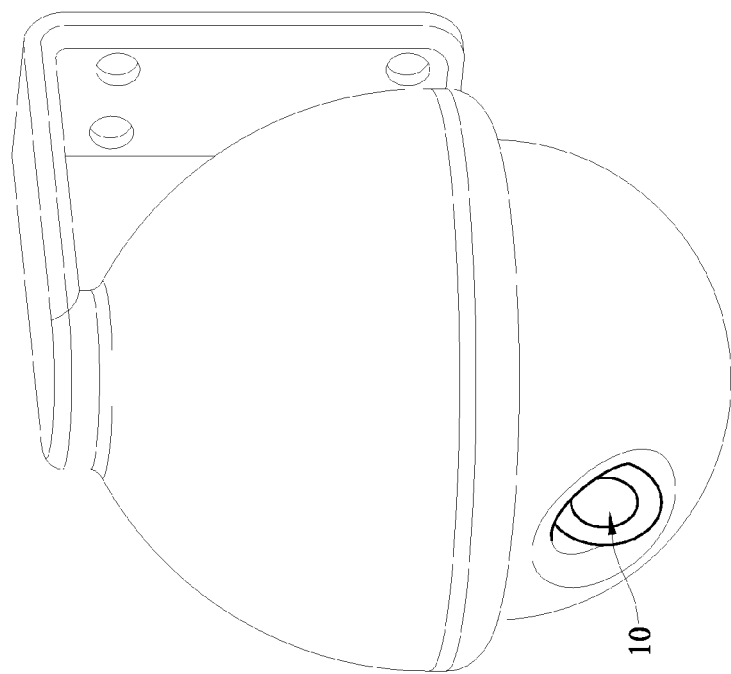
FIG. 23 shows an electronic device according to yet another embodiment.

In FIG. 20, FIG. 21, FIG. 22 and FIG. 23, an image capturing device 10 may be installed in, but not limited to, an electronic device, including a smart phone (FIG. 20), a tablet personal computer (FIG. 21), a wearable device (FIG. 22) or an infrared camera (FIG. 23). The four exemplary figures of different kinds of electronic device are only exemplary for showing the image capturing device of present disclosure installing in an electronic device and is not limited thereto. In some embodiments, the electronic device can further include, but not limited to, a display unit, a control unit, a storage unit, a random access memory unit (RAM), a read only memory unit (ROM) or a combination thereof.

According to the optical imaging system of the present disclosure, the optical imaging system can be optionally applied to moving focus optical systems. Furthermore, the optical imaging system is featured with good capability in the correction of aberration and high image quality, and can be applied to 3D (three-dimensional) image capturing applications, in products such as digital cameras, mobile devices, digital tablets, wearable devices, smart televisions, wireless monitoring devices, motion sensing input devices, driving recorders, rear view cameras and other electronic imaging devices. The optical imaging system can also be applied to infrared image capturing applications such as motion sensing, low-light photography and iris recognition. In detail, the optical imaging system can be operated within a wavelength range of 750 nm to 1050 nm, but the disclosure does not limited thereto. According to the above description of the present disclosure, the following specific embodiments are provided for further explanation.

1st Embodiment

Figure 2:
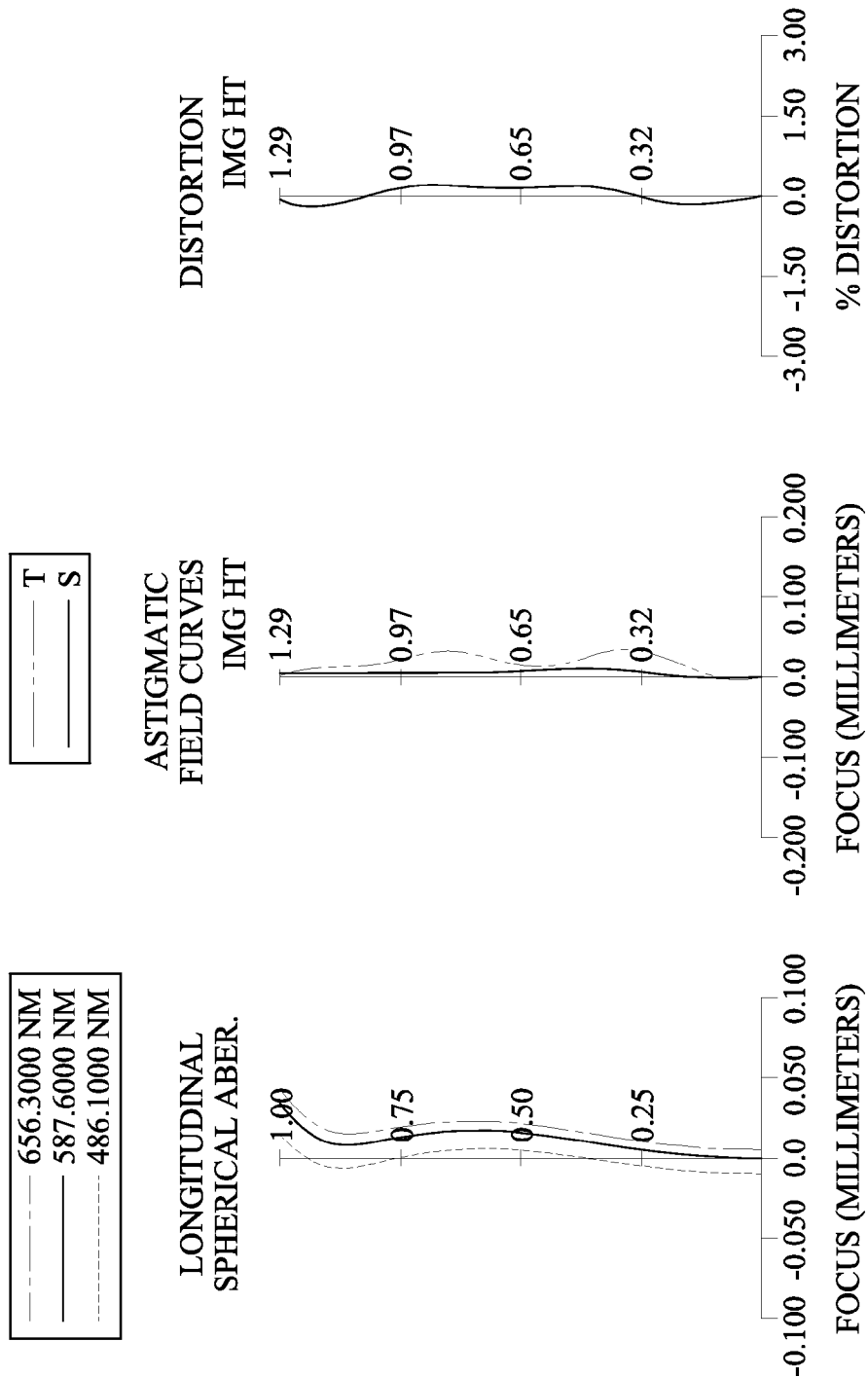
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging system (its reference numeral is omitted) of the present disclosure and an image sensor 160. The optical imaging system includes, in order from an object side to an image side, a first lens element 110, an aperture stop 100, a second lens element 120, a third lens element 130, a filter 140 and an image surface 150, wherein the optical imaging system has a total of three lens elements (110-130) with refractive power.

The first lens element 110 with positive refractive power has an object-side surface 111 being convex in a paraxial region thereof and an image-side surface 112 being convex in a paraxial region thereof. The first lens element 110 is made of plastic material, and has the object-side surface 111 and the image-side surface 112 being both aspheric.

The second lens element 120 with positive refractive power has an object-side surface 121 being concave in a paraxial region thereof and an image-side surface 122 being convex in a paraxial region thereof. The second lens element 120 is made of plastic material, and has the object-side surface 121 and the image-side surface 122 being both aspheric.

The third lens element 130 with negative refractive power has an object-side surface 131 being concave in a paraxial region thereof and an image-side surface 132 being concave in a paraxial region thereof. The third lens element 130 is made of plastic material, and has the object-side surface 131 and the image-side surface 132 being both aspheric. The image-side surface 132 of the third lens element 130 has at least one convex shape in an off-axis region thereof.

The filter 140 is made of glass and located between the third lens element 130 and the image surface 150, and will not affect the focal length of the optical imaging system. The image sensor 160 is disposed on or near the image surface 150 of the optical imaging system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging system of the image capturing unit according to the 1st embodiment, when a focal length of the optical imaging system is f, an f-number of the optical imaging system is Fno, and half of a maximal field of view of the optical imaging system is HFOV, these parameters have the following values: f=2.12 millimeters (mm); Fno=2.85; and HFOV=31.3 degrees (deg.).

When a refractive index of the second lens element 120 is N2, a refractive index of the third lens element 130 is N3, the following condition is satisfied: N2+N3=3.222.

When an Abbe number of the second lens element 120 is V2, an Abbe number of the third lens element 130 is V3, the following condition is satisfied: V2+V3=53.70.

When the Abbe number of the second lens element 120 is V2, the Abbe number of the third lens element 130 is V3, the following condition is satisfied: V2/V3=1.29.

When a central thickness of the first lens element 110 is CT1, a central thickness of the third lens element 130 is CT3, the following condition is satisfied: CT1/CT3=2.02.

When a sum of central thicknesses of the first lens element 110, the second lens element 120 and the third lens element 130 is ΣCT, the central thickness of the first lens element 110 is CT1, the following condition is satisfied: ΣCT/CT1=2.66.

When an axial distance between the first lens element 110 and the second lens element 120 is T12, an axial distance between the second lens element 120 and the third lens element 130 is T23, the following condition is satisfied: T12/T23=4.83.

When a focal length of the first lens element 110 is f1, a curvature radius of the image-side surface 112 of the first lens element 110 is R2, the following condition is satisfied: f1/R2=−0.34.

When the focal length of the first lens element 110 is f1, a focal length of the second lens element 120 is f2, a focal length of the third lens element 130 is f3, the following condition is satisfied: (|f3|/f2)+(f2/f1)=1.41.

When an axial distance between the object-side surface 111 of the first lens element 110 and the image-side surface 132 of the third lens element 130 is TD, the following condition is satisfied: TD=2.05 mm.

When an axial distance between the stop 100 and the image-side surface 132 of the third lens element 130 is SD, the axial distance between the object-side surface 111 of the first lens element 110 and the image-side surface 132 of the third lens element 130 is TD, the following condition is satisfied: SD/TD=0.66.

When an axial distance between the object-side surface 111 of the first lens element 110 and the image surface 150 is TL, an entrance pupil diameter of the optical imaging system is EPD, the following condition is satisfied: TL/EPD=3.87.

The detailed optical data of the 1st embodiment are shown in Table 1 and the aspheric surface data are shown in Table 2 below.

TABLE 1

1st Embodiment
f = 2.12 mm, Fno = 2.85, HFOV = 31.3 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 1.019 | (ASP) | 0.694 | Plastic | 1.530 | 55.8 | 1.66 |
| 2 |  | −4.848 | (ASP) | −0.005 |  |  |  |  |
| 3 | Ape. Stop | Plano |  | 0.174 |  |  |  |  |
| 4 | Lens 2 | −0.988 | (ASP) | 0.811 | Plastic | 1.583 | 30.2 | 0.78 |
| 5 |  | −0.407 | (ASP) | 0.035 |  |  |  |  |
| 6 | Lens 3 | −1.429 | (ASP) | 0.343 | Plastic | 1.639 | 23.5 | −0.73 |
| 7 |  | 0.751 | (ASP) | 0.300 |  |  |  |  |
| 8 | Filter | Plano |  | 0.175 | Glass | 1.517 | 64.2 | — |
| 9 |  | Plano |  | 0.350 |  |  |  |  |
| 10 | Image | Plano |  | — |  |  |  |  |

Note:
Reference wavelength (d-line) is 587.6 nm.

TABLE 2

Aspheric Coefficients

| Surface # | 1 | 2 | 4 |
|---|---|---|---|
| k = | −1.8008E−01 | 8.8866E+01 | −4.6646E−01 |
| A4 = | 1.0496E−02 | −3.3477E−01 | −1.2490E+00 |
| A6 = | −9.9601E−02 | −2.4522E+00 | 1.4456E+00 |
| A8 = | −1.6964E−01 | 1.9039E−01 | −9.9431E+00 |
| A10 = | −9.5771E−01 | 1.7486E+01 | −4.8123E+02 |
| A12 = | −2.1512E+00 | 7.7858E+02 | 4.2192E+03 |
| A14 = | — | — | −6.8951E+03 |

| Surface # | 5 | 6 | 7 |
|---|---|---|---|
| k = | −4.1456E+00 | −8.4382E+01 | −1.4820E+01 |
| A4 = | −3.2062E+00 | −4.3189E+00 | −9.5400E−01 |
| A6 = | 1.6991E+01 | 3.2435E+01 | 2.6419E+00 |
| A8 = | −5.9613E+01 | −1.9177E+02 | −5.9709E+00 |
| A10 = | 1.0329E+02 | 7.6004E+02 | 8.5857E+00 |
| A12 = | −7.8105E+01 | −1.9307E+03 | −7.5425E+00 |
| A14 = | 4.0469E+01 | 2.7528E+03 | 3.5833E+00 |
| A16 = | — | −1.6232E+03 | −6.4767E−01 |

In Table 1, the curvature radius, the thickness and the focal length are shown in millimeters (mm). Surface numbers 0-10 represent the surfaces sequentially arranged from the object-side to the image-side along the optical axis. In Table 2, k represents the conic coefficient of the equation of the aspheric surface profiles. A4-16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
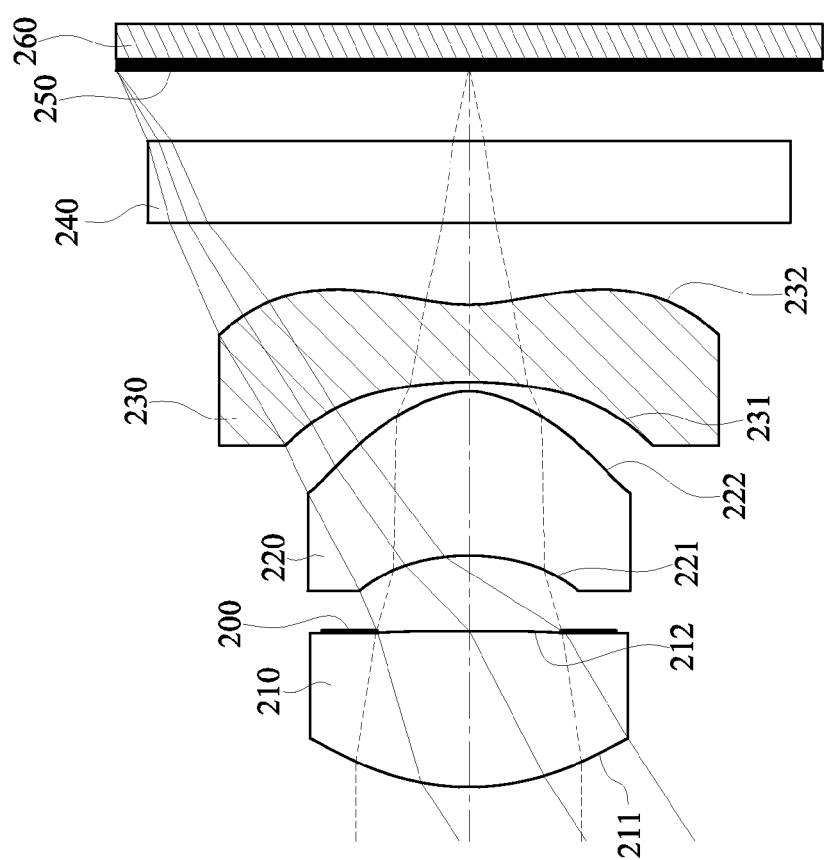
FIG. 3 is a schematic view of an image capturing unit according to the 2nd embodiment of the present disclosure.
Figure 4:
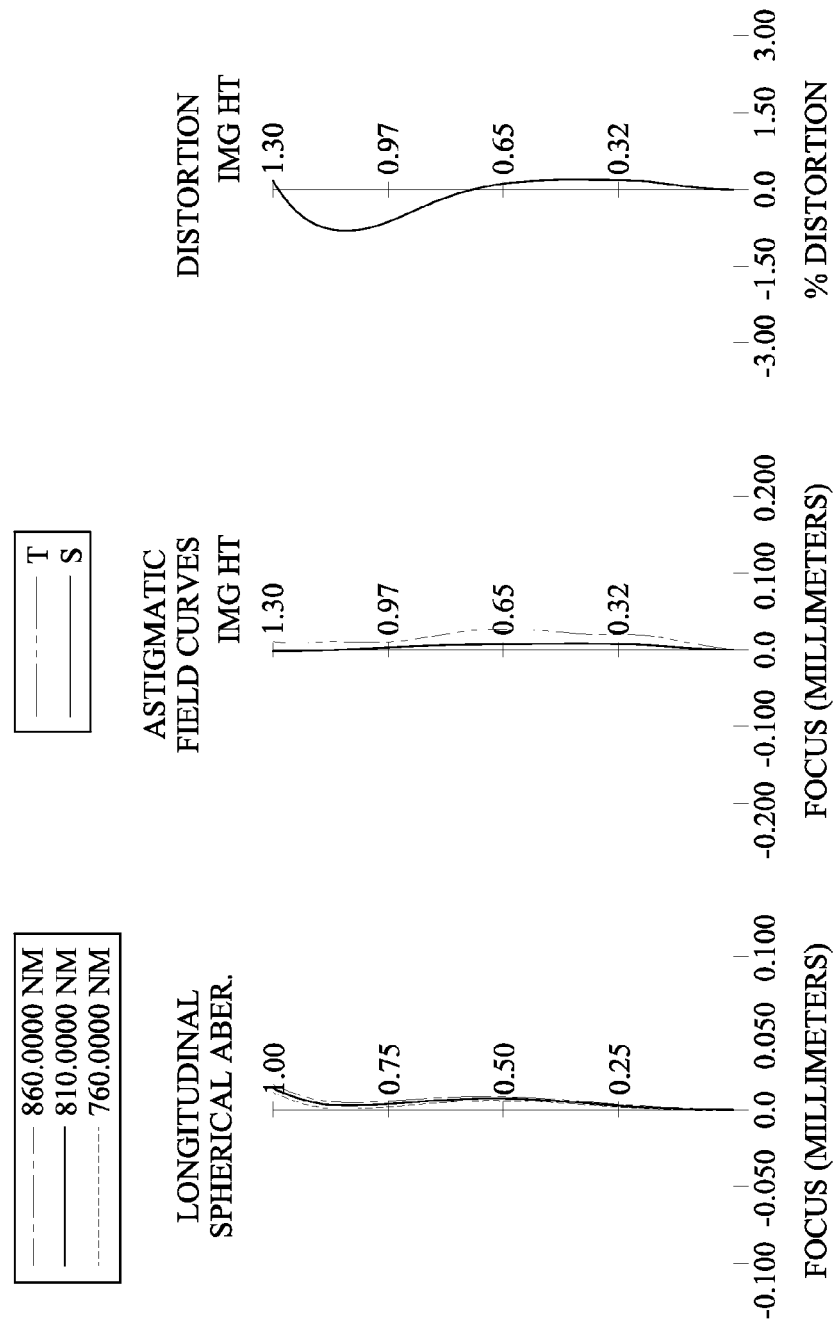
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging system (its reference numeral is omitted) of the present disclosure and an image sensor 260. The optical imaging system includes, in order from an object side to an image side, a first lens element 210, an aperture stop 200, a second lens element 220, a third lens element 230, a filter 240 and an image surface 250, wherein the optical imaging system has a total of three lens elements (210-230) with refractive power.

The first lens element 210 with positive refractive power has an object-side surface 211 being convex in a paraxial region thereof and an image-side surface 212 being convex in a paraxial region thereof. The first lens element 210 is made of plastic material, and has the object-side surface 211 and the image-side surface 212 being both aspheric.

The second lens element 220 with positive refractive power has an object-side surface 221 being concave in a paraxial region thereof and an image-side surface 222 being convex in a paraxial region thereof. The second lens element 220 is made of plastic material, and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of plastic material, and has the object-side surface 231 and the image-side surface 232 being both aspheric. The image-side surface 232 of the third lens element 230 has at least one convex shape in an off-axis region thereof.

The filter 240 is made of glass and located between the third lens element 230 and the image surface 250, and will not affect the focal length of the optical imaging system. The image sensor 260 is disposed on or near the image surface 250 of the optical imaging system.

Figure 5:
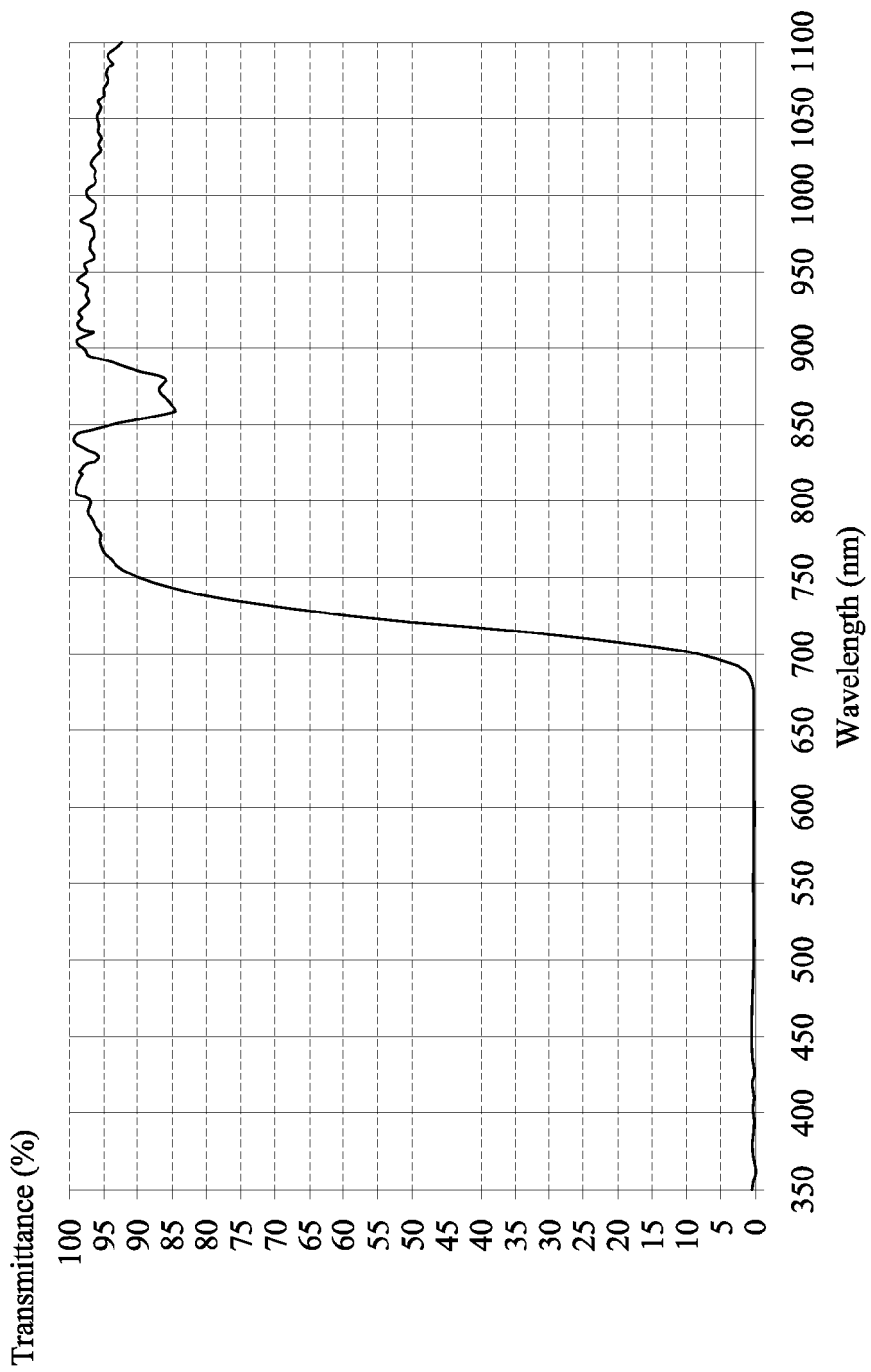
FIG. 5 is a transmittance reference spectrum of the third lens element according to the 2nd embodiment of the present disclosure.
Figure 6:
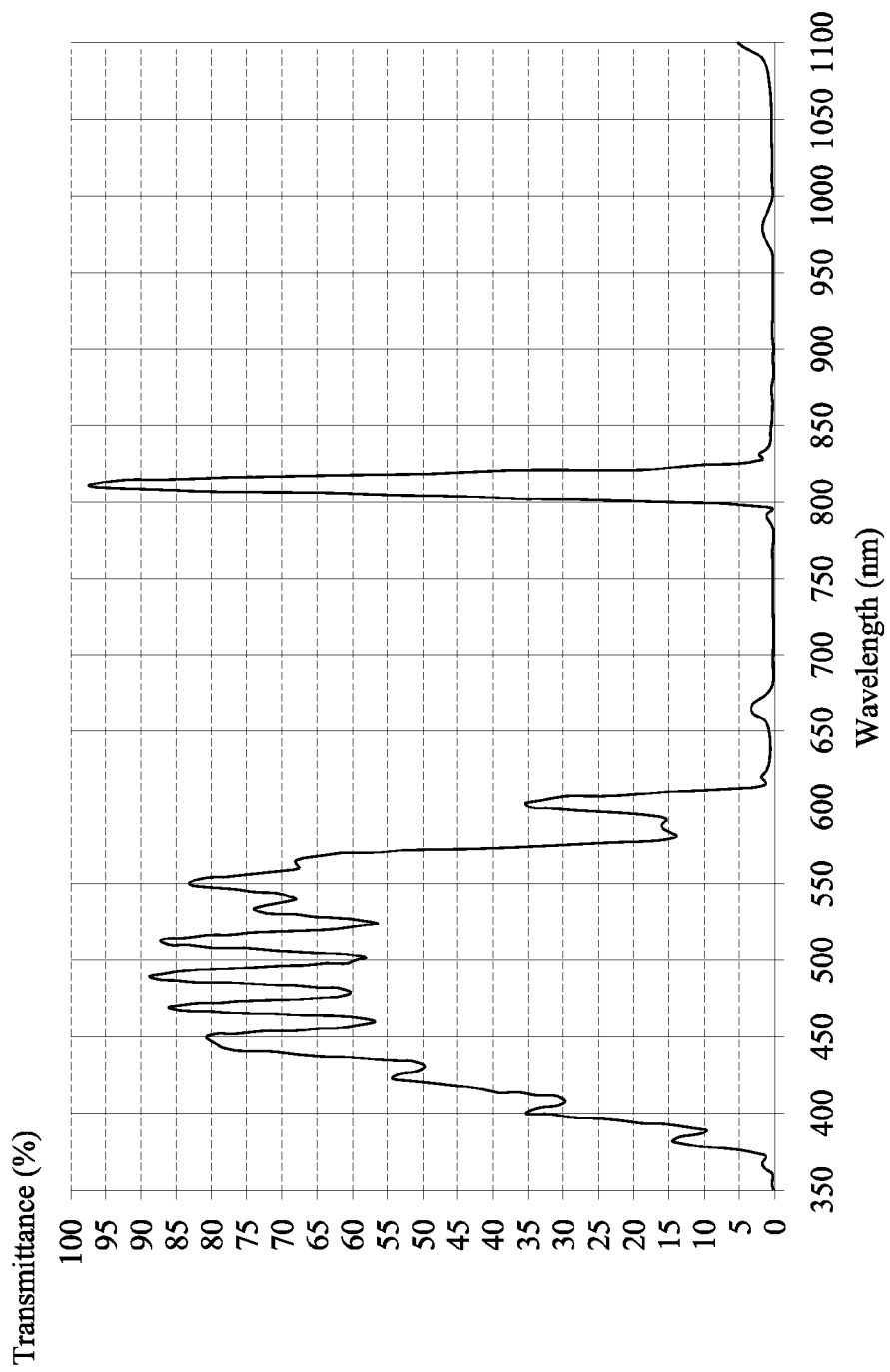
FIG. 6 is a transmittance reference spectrum of the first lens element, the second lens element and the filter according to the 2nd embodiment of the present disclosure.
Figure 7:
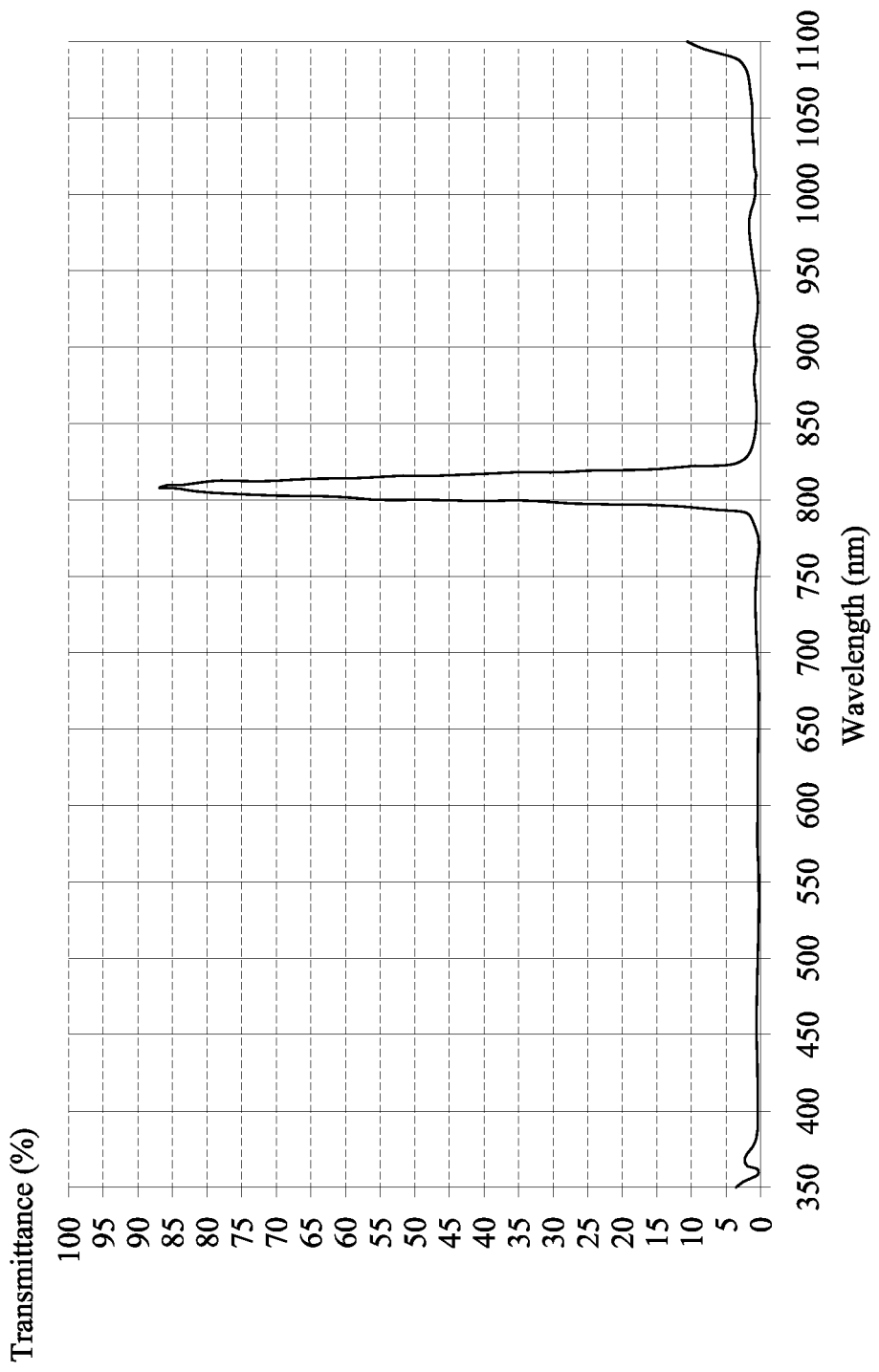
FIG. 7 is a transmittance reference spectrum of the optical imaging system according to the 2nd embodiment of the present disclosure.

In the 2nd embodiment, the third lens element 230 is made of visible-light-absorbing material for absorbing visible light. The first lens element 210, the second lens element 220 and the filter 240 are not made of visible-light-absorbing material so as to allow the visible light to pass through the first lens element 210, the second lens element 220 and the filter 240. Therefore, the third lens element 230 is favorable for effectively reducing the transmittance of the visible light. In detail, the third lens element 230 is for absorbing the incident light in a wavelength range of 400 nanometers (nm) to 700 nm (the visible light spectrum) so that transmittance of the visible light is less than 50%. Therefore, the optical imaging system is favorable for being properly operated at a wavelength of 810 nm. As seen in FIG. 5, FIG. 6 and FIG. 7, FIG. 5 is a transmittance reference spectrum of the third lens element according to the 2nd embodiment of the present disclosure, FIG. 6 is a transmittance reference spectrum of the first lens element, the second lens element and the filter according to the 2nd embodiment of the present disclosure, and FIG. 7 is a transmittance reference spectrum of the optical imaging system according to the 2nd embodiment of the present disclosure.

The detailed optical data of the 2nd embodiment are shown in Table 3 and the aspheric surface data are shown in Table 4 below.

TABLE 3

2nd Embodiment
f = 1.99 mm, Fno = 2.40, HFOV = 33.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 0.952 | (ASP) | 0.572 | Plastic | 1.528 | 55.7 | 1.78 |
| 2 | | −71.643 | (ASP) | 0.002 | | | | |
| 3 | Ape. Stop | Plano | | 0.274 | | | | |
| 4 | Lens 2 | −0.869 | (ASP) | 0.603 | Plastic | 1.528 | 55.7 | 0.67 |
| 5 | | −0.312 | (ASP) | 0.035 | | | | |
| 6 | Lens 3 | −1.214 | (ASP) | 0.283 | Plastic | 1.631 | 21.5 | −0.65 |
| 7 | | 0.670 | (ASP) | 0.300 | | | | |
| 8 | Filter | Plano | | 0.300 | Glass | 1.511 | 64.2 | — |
| 9 | | Plano | | 0.261 | | | | |
| 10 | Image | Plano | | — | | | | |

Note:
Reference wavelength is 810 nm.

TABLE 4

Aspheric Coefficients

| Surface # | 1 | 2 | 4 |
|---|---|---|---|
| k = | −2.0585E−01 | −9.0000E+01 | 1.9219E+00 |
| A4 = | −2.0225E−02 | −2.9746E−01 | −5.9521E−01 |
| A6 = | −7.7181E−02 | −1.3164E+00 | −2.6354E+00 |
| A8 = | −1.0311E−01 | 3.8863E+00 | 5.9104E+01 |
| A10 = | −1.1378E+00 | −1.8311E+01 | −7.4996E+02 |
| A12 = | −3.0309E+00 | 8.3160E+01 | 4.2192E+03 |
| A14 = | −8.7068E−01 | −2.0690E−08 | −6.8951E+03 |
| A16 = | 4.9650E+00 | −8.4984E−09 | 6.6018E−09 |

| Surface # | 5 | 6 | 7 |
|---|---|---|---|
| k = | −4.5663E+00 | −8.4382E+01 | −1.4820E+01 |
| A4 = | −4.5232E+00 | −1.4139E+00 | −8.5871E−01 |
| A6 = | 4.4870E+01 | 7.9114E+00 | 1.6360E+00 |
| A8 = | −3.7328E+02 | −7.4114E+01 | −3.9217E+00 |
| A10 = | 1.9331E+03 | 3.8321E+02 | 7.1303E+00 |
| A12 = | −5.8282E+03 | −1.0423E+03 | −8.1344E+00 |
| A14 = | 9.3693E+03 | 1.4080E+03 | 4.6997E+00 |
| A16 = | −6.0937E+03 | −7.3866E+02 | −9.5481E−01 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.99 | ΣCT/CT1 | 2.55 |
| Fno | 2.40 | T12/T23 | 7.89 |
| HFOV [deg.] | 33.0 | f1/R2 | −0.02 |
| N2 + N3 | 3.159 | (|f3|/f2) + (f2/f1) | 1.35 |
| V2 + V3 | 77.20 | TD [mm] | 1.77 |
| V2/V3 | 2.59 | SD/TD | 0.68 |
| CT1/CT3 | 2.02 | TL/EPD | 3.18 |

3rd Embodiment

Figure 8:
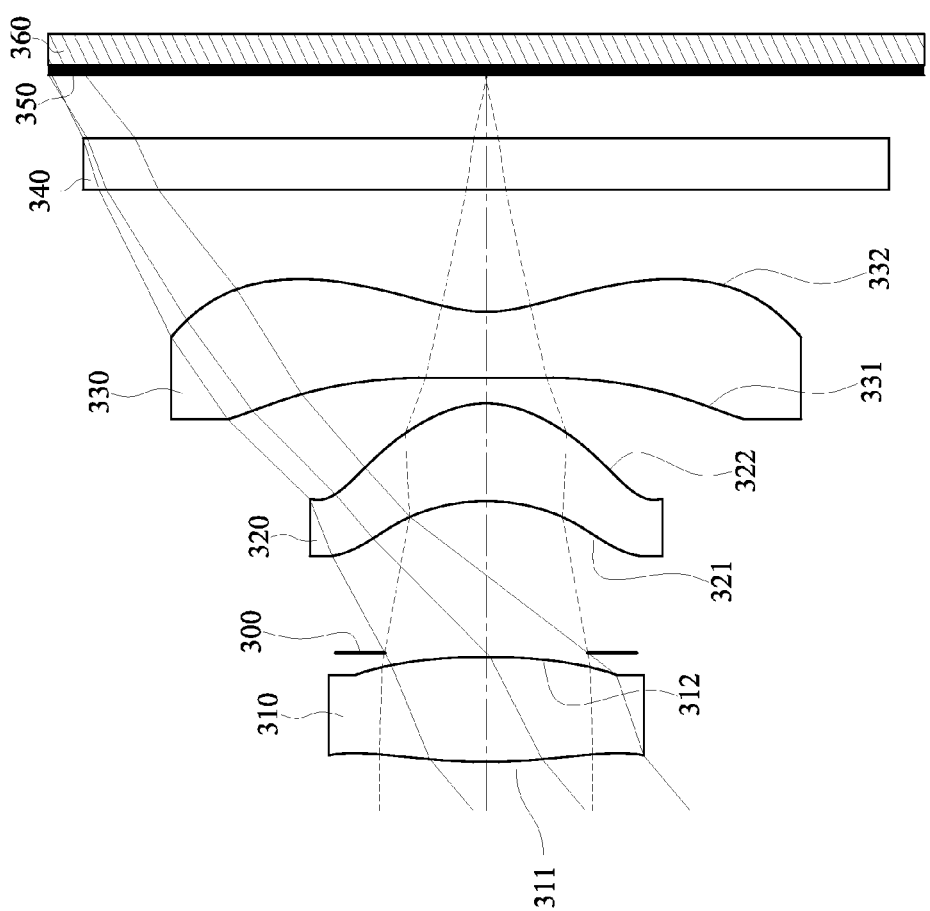
FIG. 8 is a schematic view of an image capturing unit according to the 3rd embodiment of the present disclosure.

FIG. 8 is a schematic view of an image capturing unit according to the 3rd embodiment of the present disclosure.

Figure 9:
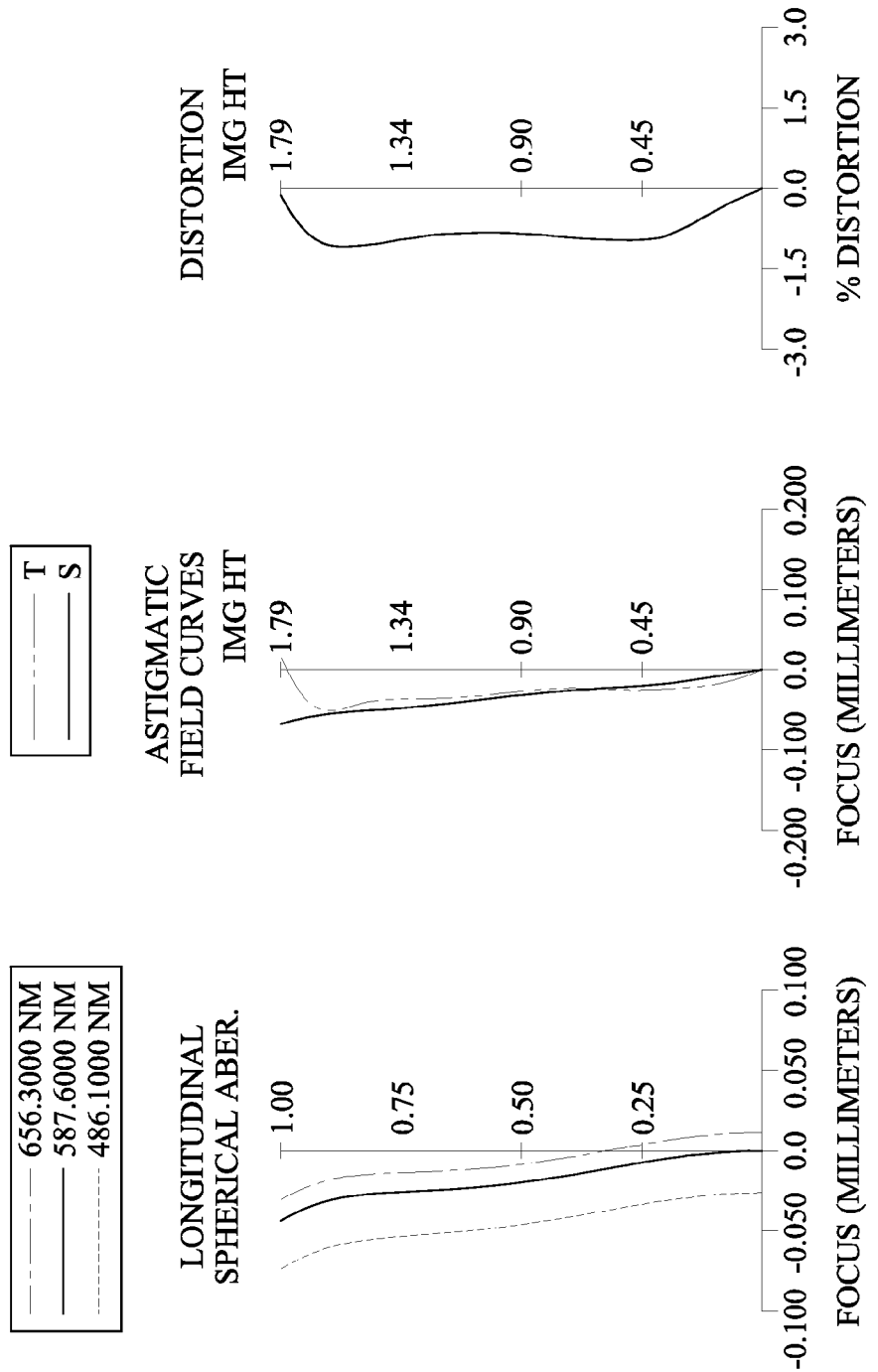
FIG. 9 shows spherical aberration curves, astigmatic field curves and a distortion curve of the image capturing unit according to the 3rd embodiment.

FIG. 9 shows, in order from left to right, spherical aberration curves, astigmatic field curves and a distortion curve of the image capturing unit according to the 3rd embodiment. In FIG. 8, the image capturing unit includes the optical imaging system (its reference numeral is omitted) of the present disclosure and an image sensor 360. The optical imaging system includes, in order from an object side to an image side, a first lens element 310, an aperture stop 300, a second lens element 320, a third lens element 330, a filter 340 and an image surface 350, wherein the optical imaging system has a total of three lens elements (310-330) with refractive power.

The first lens element 310 with positive refractive power has an object-side surface 311 being convex in a paraxial region thereof and an image-side surface 312 being convex in a paraxial region thereof. The first lens element 310 is made of plastic material, and has the object-side surface 311 and the image-side surface 312 being both aspheric.

The second lens element 320 with positive refractive power has an object-side surface 321 being concave in a paraxial region thereof and an image-side surface 322 being convex in a paraxial region thereof. The second lens element 320 is made of plastic material, and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material, and has the object-side surface 331 and the image-side surface 332 being both aspheric. The image-side surface 332 of the third lens element 330 has at least one convex shape in an off-axis region thereof.

The filter 340 is made of glass and located between the third lens element 330 and the image surface 350, and will not affect the focal length of the optical imaging system. The image sensor 360 is disposed on or near the image surface 350 of the optical imaging system.

The detailed optical data of the 3rd embodiment are shown in Table 5 and the aspheric surface data are shown in Table 6 below.

| 3rd Embodiment | | | |
|---|---|---|---|
| f [mm] | 2.14 | ΣCT/CT1 | 2.56 |
| Fno | 2.45 | T12/T23 | 6.09 |
| HFOV [deg.] | 40.2 | f1/R2 | −0.85 |
| N2 + N3 | 3.088 | (\|f3\|/f2) + (f2/f1) | 1.39 |
| V2 + V3 | 111.80 | TD [mm] | 1.84 |
| V2/V3 | 1.00 | SD/TD | 0.76 |
| CT1/CT3 | 1.59 | TL/EPD | 3.22 |

TABLE 5

3rd Embodiment
f = 2.14 mm, Fno = 2.45, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.301 | (ASP) | 0.430 | Plastic | 1.544 | 55.9 | 2.41 |
| 2 | | −2.851 | (ASP) | 0.017 | | | | |
| 3 | Ape. Stop | Plano | | 0.622 | | | | |
| 4 | Lens 2 | −0.791 | (ASP) | 0.400 | Plastic | 1.544 | 55.9 | 1.08 |
| 5 | | −0.396 | (ASP) | 0.105 | | | | |
| 6 | Lens 3 | 54.326 | (ASP) | 0.270 | Plastic | 1.544 | 55.9 | −1.02 |
| 7 | | 0.547 | (ASP) | 0.500 | | | | |
| 8 | Filter | Plano | | 0.210 | Glass | 1.517 | 64.2 | — |
| 9 | | Plano | | 0.260 | | | | |
| 10 | Image | Plano | | — | | | | |

Note:
Reference wavelength (d-line) is 587.6 nm.

TABLE 6

Aspheric Coefficients

| Surface # | 1 | 2 | 4 |
|---|---|---|---|
| k = | −5.2309E+00 | −5.1604E+00 | −2.1369E+00 |
| A4 = | −2.0989E−01 | −3.1211E−01 | −4.0996E−01 |
| A6 = | −1.3416E−01 | 1.9459E−01 | −3.9735E+00 |
| A8 = | −3.8720E−01 | −1.6843E+00 | 8.2354E+00 |
| A10 = | — | 3.6738E+00 | 2.4921E+01 |
| A12 = | — | — | 1.1817E+02 |
| A14 = | — | — | −6.8028E+02 |
| A16 = | — | — | 7.2786E+02 |

| Surface # | 5 | 6 | 7 |
|---|---|---|---|
| k = | −1.8711E+00 | −8.7500E+01 | −7.8929E+00 |
| A4 = | 6.6916E−01 | −2.0471E−01 | −4.5973E−01 |
| A6 = | −1.1643E+01 | −1.0691E+00 | 5.7982E−01 |
| A8 = | 7.0137E+01 | 4.5319E+00 | −5.5505E−01 |
| A10 = | −2.9901E+02 | −7.7897E+00 | 3.1010E−01 |
| A12 = | 7.9971E+02 | 6.8714E+00 | −8.8307E−02 |
| A14 = | −1.0639E+03 | −3.0303E+00 | −1.9287E−04 |
| A16 = | 5.3735E+02 | 5.2993E−01 | 4.4213E−03 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

4th Embodiment

Figure 10:
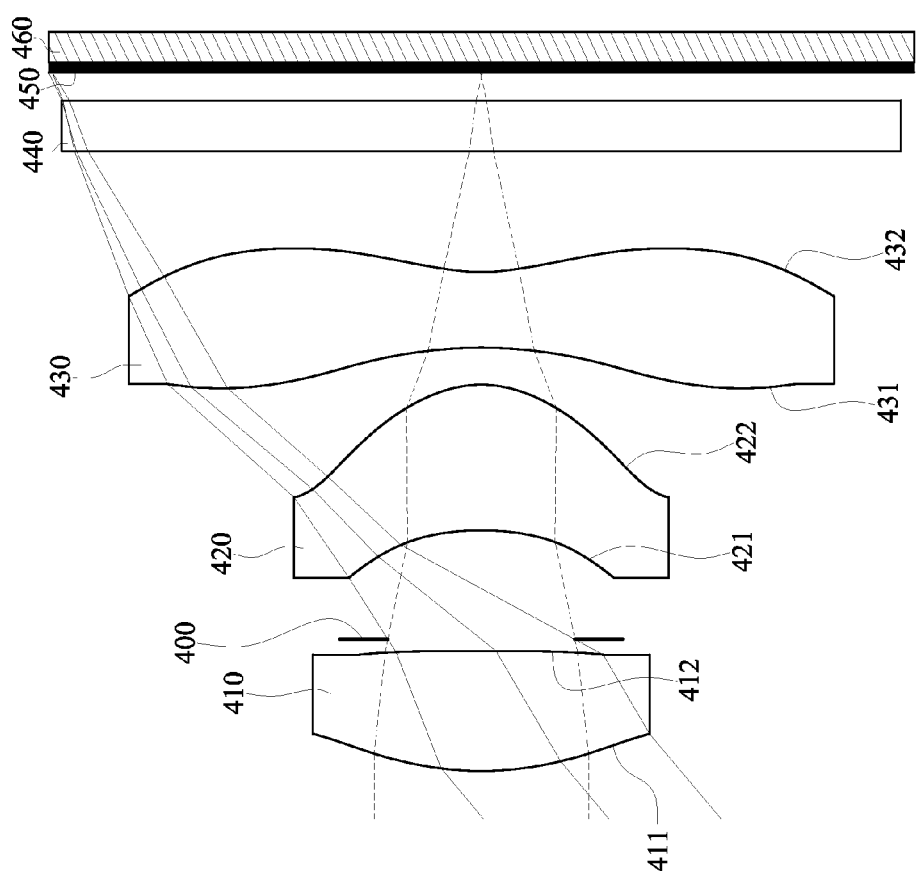
FIG. 10 is a schematic view of an image capturing unit according to the 4th embodiment of the present disclosure.
Figure 11:
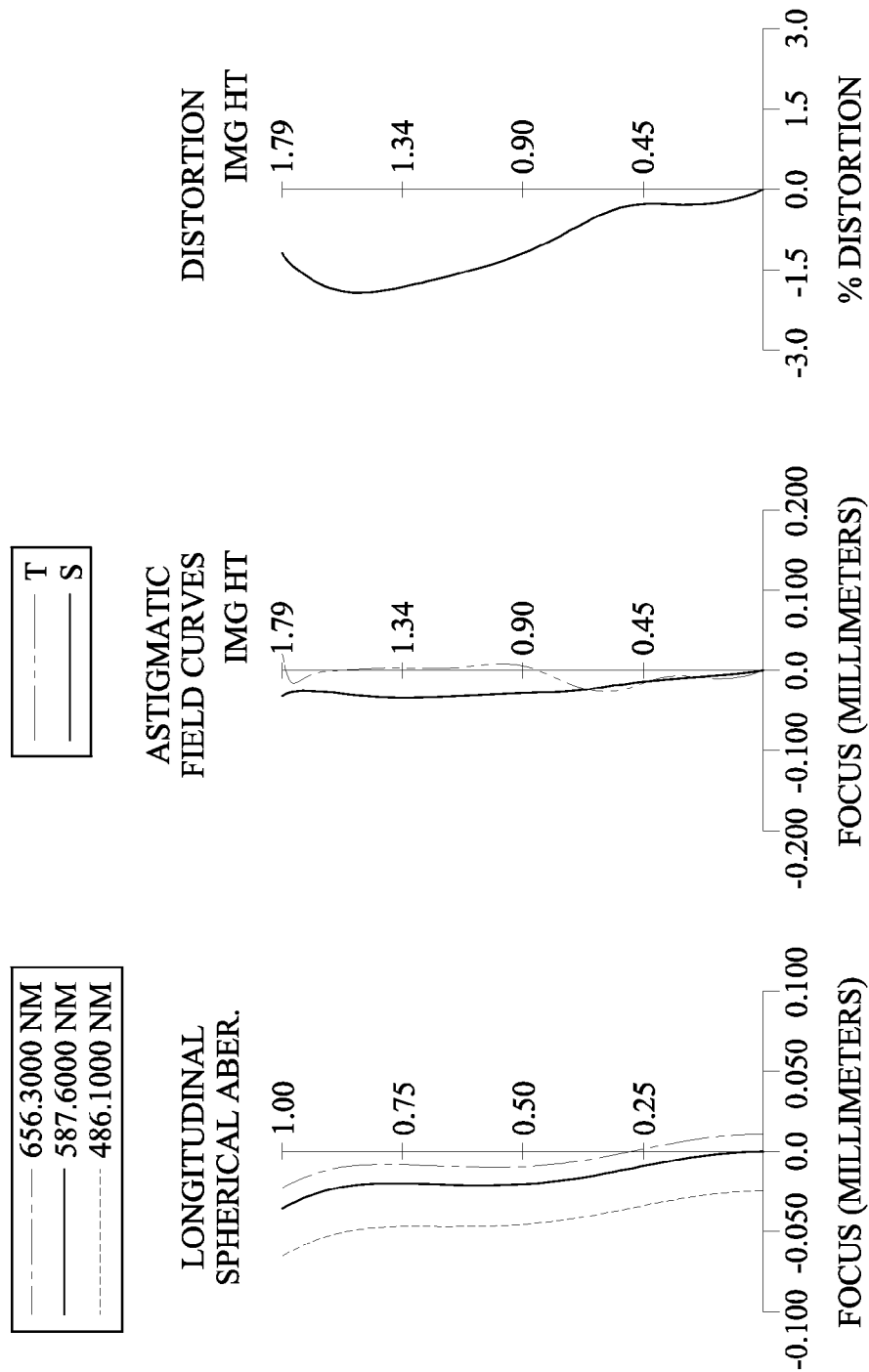
FIG. 11 shows spherical aberration curves, astigmatic field curves and a distortion curve of the image capturing unit according to the 4th embodiment.

FIG. 10 is a schematic view of an image capturing unit according to the 4th embodiment of the present disclosure. FIG. 11 shows, in order from left to right, spherical aberration curves, astigmatic field curves and a distortion curve of the image capturing unit according to the 4th embodiment. In FIG. 10, the image capturing unit includes the optical imaging system (its reference numeral is omitted) of the present disclosure and an image sensor 460. The optical imaging system includes, in order from an object side to an image side, a first lens element 410, an aperture stop 400, a second lens element 420, a third lens element 430, a filter 440 and an image surface 450, wherein the optical imaging system has a total of three lens elements (410-430) with refractive power.

The first lens element 410 with positive refractive power has an object-side surface 411 being convex in a paraxial region thereof and an image-side surface 412 being convex in a paraxial region thereof. The first lens element 410 is made of plastic material, and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material, and has the object-side surface 421 and the image-side surface 422 being both aspheric.

The third lens element 430 with negative refractive power has an object-side surface 431 being concave in a paraxial region thereof and an image-side surface 432 being concave in a paraxial region thereof. The third lens element 430 is made of plastic material, and has the object-side surface 431 and the image-side surface 432 being both aspheric. The image-side surface 432 of the third lens element 430 has at least one convex shape in an off-axis region thereof.

The filter 440 is made of glass and located between the third lens element 430 and the image surface 450, and will not affect the focal length of the optical imaging system. The image sensor 460 is disposed on or near the image surface 450 of the optical imaging system.

The detailed optical data of the 4th embodiment are shown in Table 7 and the aspheric surface data are shown in Table 8 below.

TABLE 7

4th Embodiment
f = 2.18 mm, Fno = 2.45, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.322 | (ASP) | 0.497 | plastic | 1.544 | 55.9 | 2.40 |
| 2 | | −100.000 | (ASP) | 0.049 | | | | |
| 3 | Ape. Stop | Plano | | 0.451 | | | | |
| 4 | Lens 2 | −1.123 | (ASP) | 0.604 | Plastic | 1.544 | 55.9 | 1.08 |
| 5 | | −0.458 | (ASP) | 0.153 | | | | |
| 6 | Lens 3 | −1.681 | (ASP) | 0.314 | Plastic | 1.544 | 55.9 | −1.03 |
| 7 | | 0.902 | (ASP) | 0.500 | | | | |
| 8 | Filter | Plano | | 0.210 | Glass | 1.517 | 64.2 | — |
| 9 | | Plano | | 0.116 | | | | |
| 10 | Image | Plano | | — | | | | |

Note:
Reference wavelength (d-line) is 587.6 nm.

TABLE 8

Aspheric Coefficients

| Surface # | 1 | 2 | 4 |
|---|---|---|---|
| k = | −5.2426E−01 | 9.0000E+01 | −4.0217E−01 |
| A4 = | −7.1027E−02 | −2.0029E−01 | −2.4926E−01 |
| A6 = | 2.2864E−02 | 1.1469E−01 | −1.0944E+01 |
| A8 = | −3.9409E−01 | −1.1786E+00 | 1.0364E+02 |
| A10 = | — | 2.2456E+00 | −6.4592E+02 |
| A12 = | — | — | 2.7019E+03 |
| A14 = | — | — | −6.2081E+03 |
| A16 = | — | — | 5.7867E+03 |

| Surface # | 5 | 6 | 7 |
|---|---|---|---|
| k = | −2.4867E+00 | −9.0000E+01 | −8.1530E+00 |
| A4 = | −2.7091E−01 | −8.2354E−01 | −5.3275E−01 |
| A6 = | −6.6960E+00 | 1.9367E+00 | 8.0559E−01 |
| A8 = | 4.8873E+01 | −2.1590E+00 | −8.2740E−01 |
| A10 = | −1.8954E+02 | 1.4054E+00 | 5.4240E−01 |
| A12 = | 4.1185E+02 | −5.4099E−01 | −2.2105E−01 |
| A14 = | −4.4605E+02 | 1.1404E−01 | 5.0597E−02 |
| A16 = | 1.8760E+02 | −1.0151E−02 | −4.8952E−03 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.18 | ΣCT/CT1 | 2.85 |
| Fno | 2.45 | T12/T23 | 3.27 |
| HFOV [deg.] | 40.0 | f1/R2 | −0.02 |
| N2 + N3 | 3.088 | (|f3|/f2) + (f2/f1) | 1.40 |
| V2 + V3 | 111.80 | TD [mm] | 2.07 |
| V2/V3 | 1.00 | SD/TD | 0.74 |
| CT1/CT3 | 1.58 | TL/EPD | 3.26 |

5th Embodiment

Figure 12:
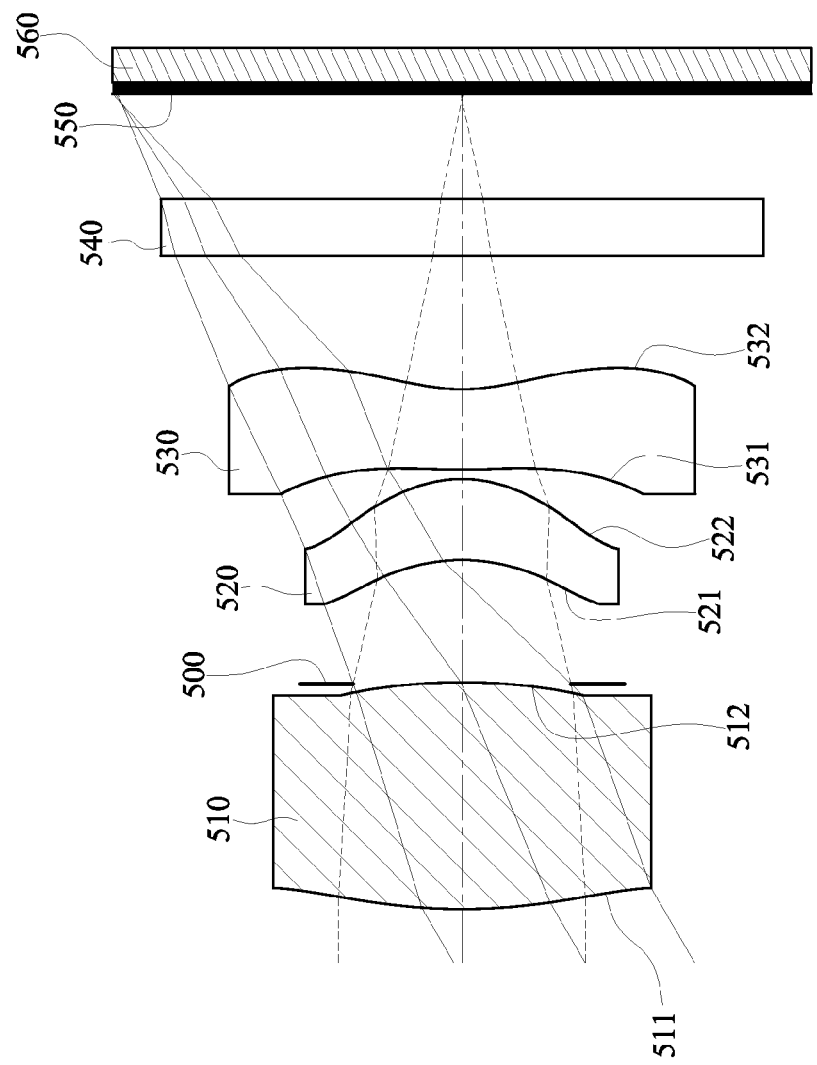
FIG. 12 is a schematic view of an image capturing unit according to the 5th embodiment of the present disclosure.
Figure 13:
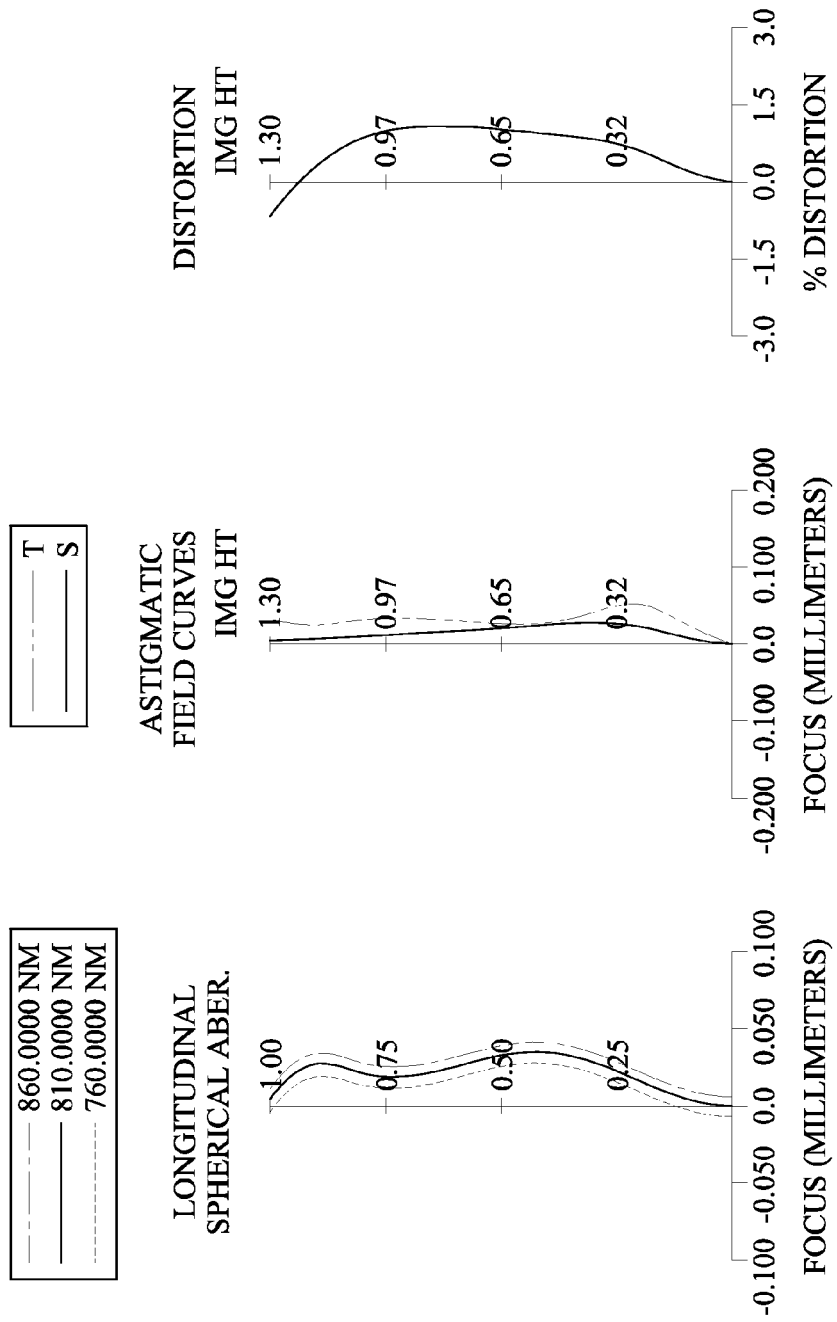
FIG. 13 shows spherical aberration curves, astigmatic field curves and a distortion curve of the image capturing unit according to the 5th embodiment.

FIG. 12 is a schematic view of an image capturing unit according to the 5th embodiment of the present disclosure. FIG. 13 shows, in order from left to right, spherical aberration curves, astigmatic field curves and a distortion curve of the image capturing unit according to the 5th embodiment. In FIG. 12, the image capturing unit includes the optical imaging system (its reference numeral is omitted) of the present disclosure and an image sensor 560. The optical imaging system includes, in order from an object side to an image side, a first lens element 510, an aperture stop 500, a second lens element 520, a third lens element 530, a filter 540 and an image surface 550, wherein the optical imaging system has a total of three lens elements (510-530) with refractive power.

The first lens element 510 with positive refractive power has an object-side surface 511 being convex in a paraxial region thereof and an image-side surface 512 being convex in a paraxial region thereof. The first lens element 510 is made of plastic material, and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material, and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material, and has the object-side surface 531 and the image-side surface 532 being both aspheric. The image-side surface 532 of the third lens element 530 has at least one convex shape in an off-axis region thereof.

The filter 540 is made of glass and located between the third lens element 530 and the image surface 550, and will not affect the focal length of the optical imaging system. The image sensor 560 is disposed on or near the image surface 550 of the optical imaging system.

In the 5th embodiment, the first lens element 510 is made of visible-light-absorbing material for absorbing visible light. The second lens element 520, the third lens element 530 and the filter 540 are not made of visible-light-absorbing material so as to allow the visible light to pass through the second lens element 520, the third lens element 530 and the filter 540. Therefore, the first lens element 510 is for absorbing the incident light in a wavelength range of 400 nm to 700 nm (the visible light spectrum) so that the optical imaging system is favorable for being properly operated at a wavelength of 810 nm.

The detailed optical data of the 5th embodiment are shown in Table 9 and the aspheric surface data are shown in Table 10 below.

TABLE 9

5th Embodiment
f = 2.21 mm, Fno = 2.40, HFOV = 30.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.017 | (ASP) | 0.847 | Plastic | 1.570 | 30.2 | 2.13 |
| 2 | | −2.602 | (ASP) | −0.005 | | | | |
| 3 | Ape. Stop | Plano | | 0.462 | | | | |
| 4 | Lens 2 | −0.710 | (ASP) | 0.303 | Plastic | 1.570 | 30.2 | 2.02 |
| 5 | | −0.508 | (ASP) | 0.035 | | | | |
| 6 | Lens 3 | 2.147 | (ASP) | 0.300 | Plastic | 1.570 | 30.2 | −1.82 |
| 7 | | 0.664 | (ASP) | 0.500 | | | | |
| 8 | Filter | Plano | | 0.210 | Glass | 1.511 | 64.2 | — |
| 9 | | Plano | | 0.395 | | | | |
| 10 | Image | Plano | | — | | | | |

Note:
Reference wavelength is 810 nm.

TABLE 10

Aspheric Coefficients

| Surface # | 1 | 2 | 4 |
|---|---|---|---|
| k = | −1.1133E+00 | −3.9407E+01 | −2.6662E+00 |
| A4 = | −1.1629E−01 | −4.8972E−01 | −6.2132E−01 |
| A6 = | −1.1942E−01 | 6.2739E−02 | −6.7032E−01 |
| A8 = | 9.0142E−02 | 5.0065E+00 | −2.8840E+01 |
| A10 = | −1.9929E−01 | −1.4370E+01 | 4.0937E+02 |
| A12 = | — | — | −1.3893E+03 |
| A14 = | — | — | 1.5030E+03 |

| Surface # | 5 | 6 | 7 |
|---|---|---|---|
| k = | −7.6139E+00 | −2.1610E+01 | −8.6592E+00 |
| A4 = | −5.8237E+00 | −3.0871E+00 | −1.0200E+00 |
| A6 = | 4.7157E+01 | 1.9178E+01 | 2.9080E+00 |
| A8 = | −2.6195E+02 | −8.8574E+01 | −6.7775E+00 |
| A10 = | 8.7454E+02 | 2.6288E+02 | 9.8232E+00 |
| A12 = | −1.4452E+03 | −4.6607E+02 | −8.1434E+00 |
| A14 = | 9.1666E+02 | 4.4250E+02 | 3.1542E+00 |
| A16 = | — | −1.7194E+02 | −3.4105E−01 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.21 | ΣCT/CT1 | 1.71 |
| Fno | 2.40 | T12/T23 | 13.06 |
| HFOV [deg.] | 30.2 | f1/R2 | −0.82 |
| N2 + N3 | 3.140 | (|f3|/f2) + (f2/f1) | 1.85 |
| V2 + V3 | 60.40 | TD [mm] | 1.94 |
| V2/V3 | 1.00 | SD/TD | 0.57 |
| CT1/CT3 | 2.82 | TL/EPD | 3.31 |

6th Embodiment

Figure 14:
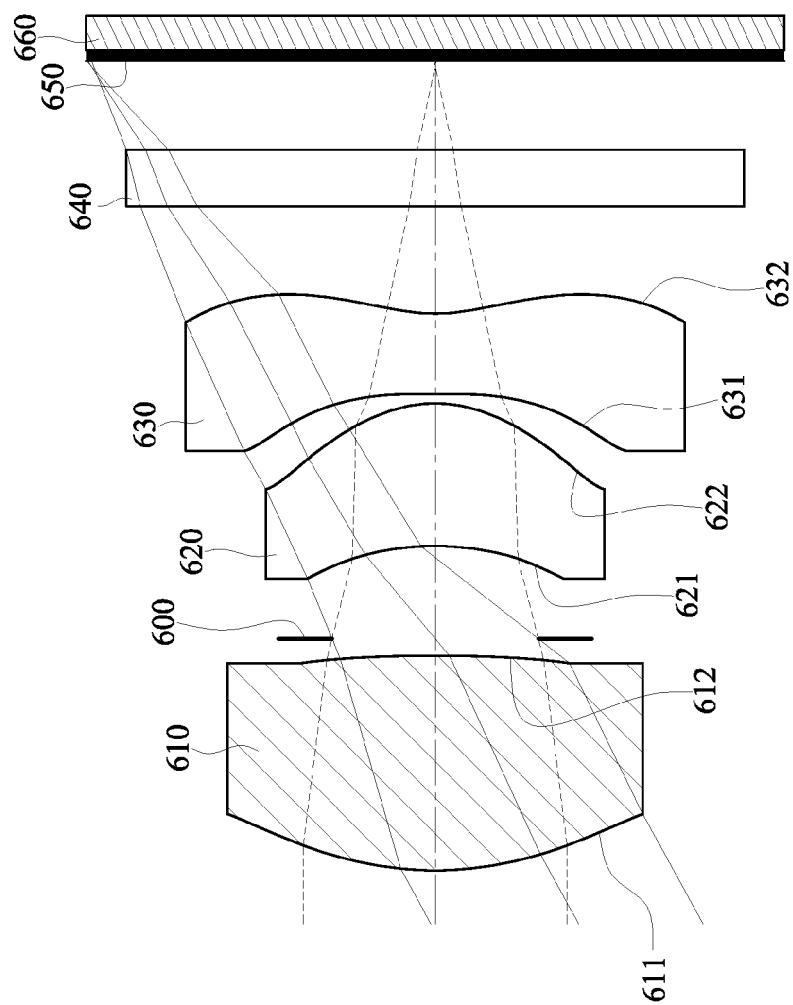
FIG. 14 is a schematic view of an image capturing unit according to the 6th embodiment of the present disclosure.

FIG. 14 is a schematic view of an image capturing unit according to the 6th embodiment of the present disclosure.

Figure 15:
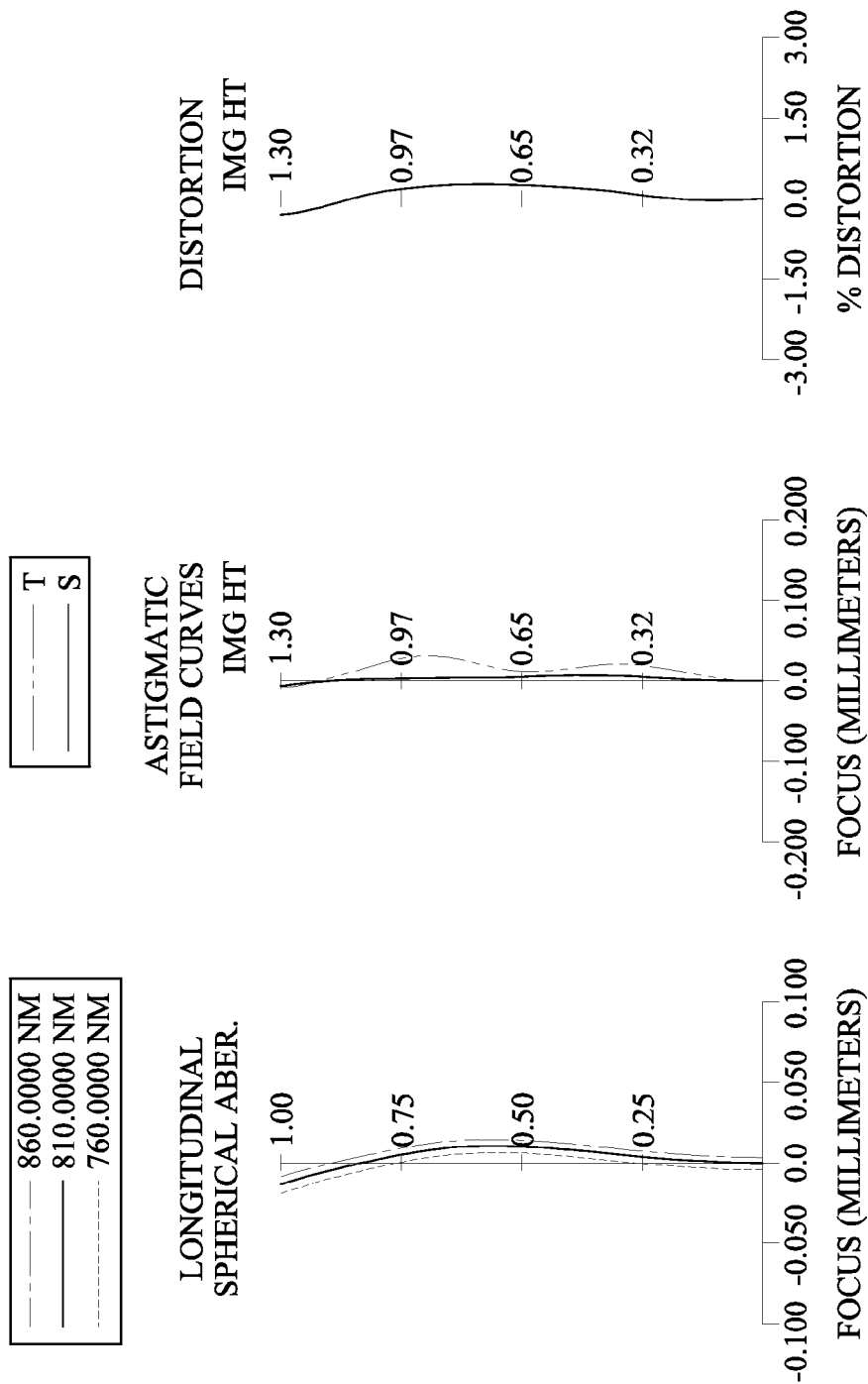
FIG. 15 shows spherical aberration curves, astigmatic field curves and a distortion curve of the image capturing unit according to the 6th embodiment.

FIG. 15 shows, in order from left to right, spherical aberration curves, astigmatic field curves and a distortion curve of the image capturing unit according to the 6th embodiment. In FIG. 14, the image capturing unit includes the optical imaging system (its reference numeral is omitted) of the present disclosure and an image sensor 660. The optical imaging system includes, in order from an object side to an image side, a first lens element 610, an aperture stop 600, a second lens element 620, a third lens element 630, a filter 640 and an image surface 650, wherein the optical imaging system has a total of three lens elements (610-630) with refractive power.

The first lens element 610 with positive refractive power has an object-side surface 611 being convex in a paraxial region thereof and an image-side surface 612 being convex in a paraxial region thereof. The first lens element 610 is made of plastic material, and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of plastic material, and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material, and has the object-side surface 631 and the image-side surface 632 being both aspheric. The image-side surface 632 of the third lens element 630 has at least one convex shape in an off-axis region thereof.

The filter 640 is made of glass and located between the third lens element 630 and the image surface 650, and will not affect the focal length of the optical imaging system. The image sensor 660 is disposed on or near the image surface 650 of the optical imaging system.

In the 6th embodiment, the first lens element 610 is made of visible-light-absorbing material for absorbing visible light. The second lens element 620, the third lens element 630 and the filter 640 are not made of visible-light-absorbing material so as to allow the visible light to pass through the second lens element 620, the third lens element 630 and the filter 640. Therefore, the first lens element 610 is for absorbing the incident light in a wavelength range of 400 nm to 700 nm (the visible light spectrum) so that the optical imaging system is favorable for being properly operated at a wavelength of 810 nm.

The detailed optical data of the 6th embodiment are shown in Table 11 and the aspheric surface data are shown in Table 12 below.

TABLE 11

6th Embodiment
f = 2.36 mm, Fno = 2.40, HFOV = 28.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.276 | (ASP) | 0.800 | Plastic | 1.528 | 55.7 | 2.13 |
| 2 | | −7.535 | (ASP) | 0.064 | | | | |
| 3 | Ape. Stop | Plano | | 0.345 | | | | |
| 4 | Lens 2 | −1.100 | (ASP) | 0.532 | Plastic | 1.570 | 30.2 | 1.30 |
| 5 | | −0.520 | (ASP) | 0.035 | | | | |
| 6 | Lens 3 | 100.000 | (ASP) | 0.300 | Plastic | 1.570 | 30.2 | −1.12 |
| 7 | | 0.634 | (ASP) | 0.400 | | | | |
| 8 | Filter | Plano | | 0.210 | Glass | 1.511 | 64.2 | — |
| 9 | | Plano | | 0.331 | | | | |
| 10 | Image | Plano | | — | | | | |

Note:
Reference wavelength is 810 nm.

TABLE 12

Aspheric Coefficients

| Surface # | 1 | 2 | 4 |
|---|---|---|---|
| k = | −2.7360E−01 | −3.0888E+01 | −1.6143E+01 |
| A4 = | −6.0697E−02 | −1.6673E−01 | −1.5035E+00 |
| A6 = | −2.9370E−02 | −4.2436E−01 | −1.1983E+00 |
| A8 = | 1.1158E−02 | 4.4085E+00 | 8.8482E+01 |
| A10 = | −3.1127E−01 | −1.8216E+01 | −9.2533E+02 |
| A12 = | 1.6998E−01 | 2.5523E+01 | 4.2192E+03 |
| A14 = | — | — | −6.8951E+03 |

| Surface # | 5 | 6 | 7 |
|---|---|---|---|
| k = | −3.5430E+00 | −9.0000E+01 | −9.5265E+00 |
| A4 = | −2.6114E+00 | −4.2127E+00 | −1.2889E+00 |
| A6 = | 1.5854E+01 | 2.7669E+01 | 4.3185E+00 |
| A8 = | −6.0385E+01 | −1.2553E+02 | −1.1116E+01 |
| A10 = | 1.1103E+02 | 3.5714E+02 | 1.8305E+01 |
| A12 = | −6.1956E+01 | −6.2695E+02 | −1.8515E+01 |
| A14 = | −8.1954E+00 | 6.3024E+02 | 1.0379E+01 |
| A16 = | — | −2.7181E+02 | −2.4318E+00 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

6th Embodiment

| | | | |
|---|---|---|---|
| f [mm] | 2.36 | ΣCT/CT1 | 2.04 |
| Fno | 2.40 | T12/T23 | 11.69 |
| HFOV [deg.] | 28.8 | f1/R2 | −0.28 |
| N2 + N3 | 3.140 | (|f3|/f2) + (f2/f1) | 1.47 |
| V2 + V3 | 60.40 | TD [mm] | 2.08 |
| V2/V3 | 1.00 | SD/TD | 0.58 |
| CT1/CT3 | 2.67 | TL/EPD | 3.07 |

7th Embodiment

Figure 16:
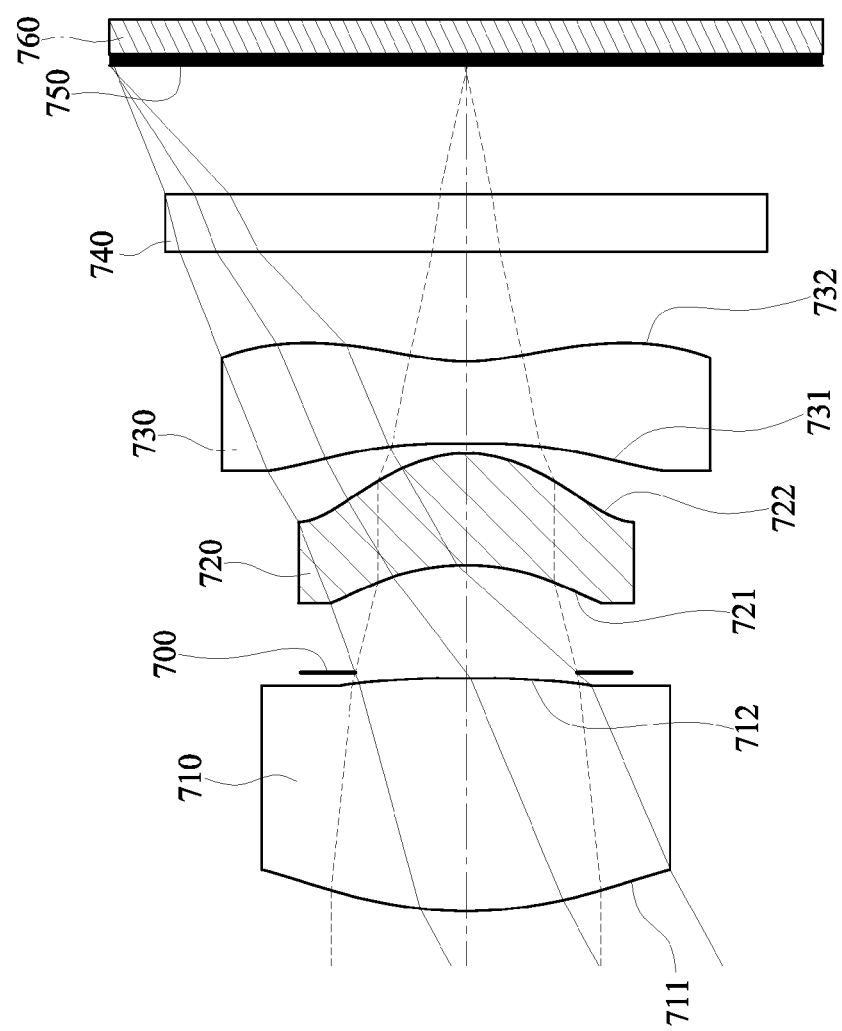
FIG. 16 is a schematic view of an image capturing unit according to the 7th embodiment of the present disclosure.
Figure 17:
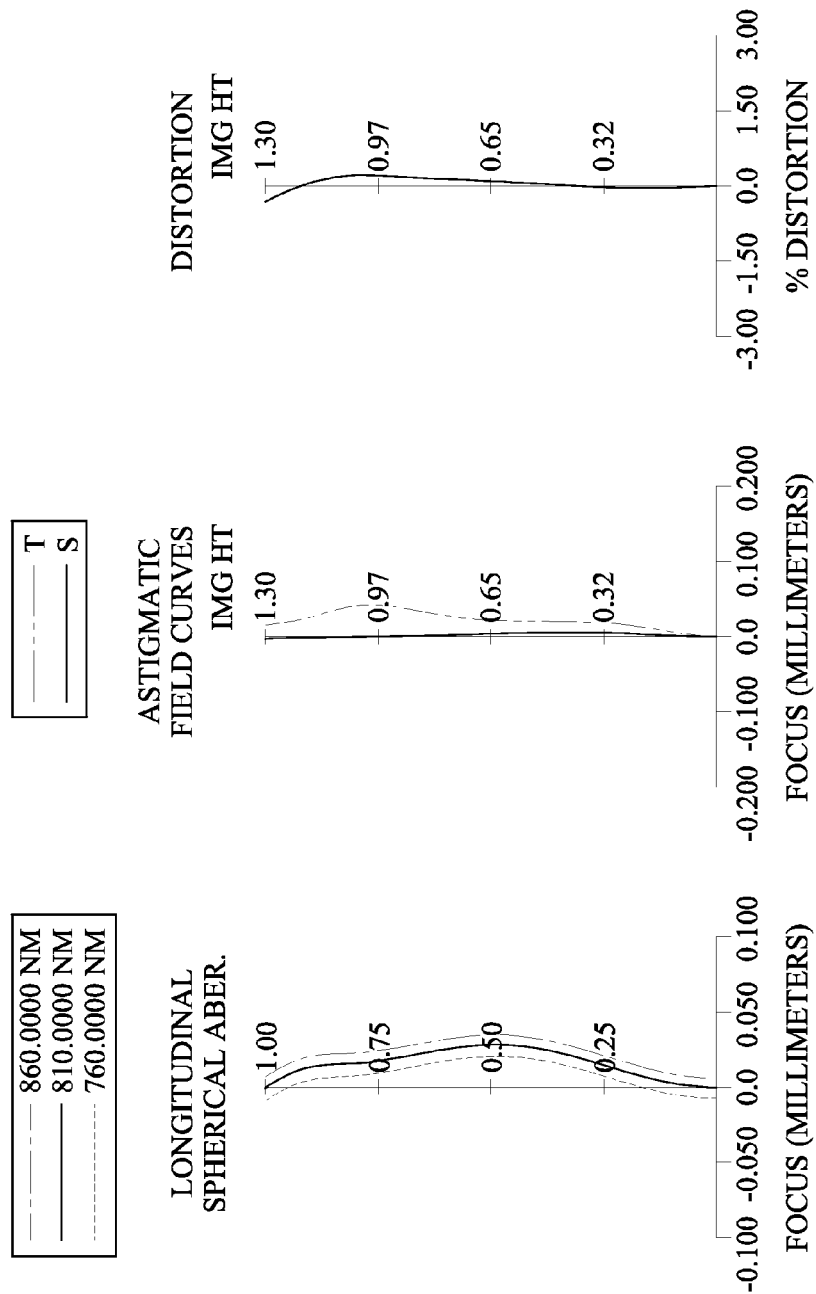
FIG. 17 shows spherical aberration curves, astigmatic field curves and a distortion curve of the image capturing unit according to the 7th embodiment.

FIG. 16 is a schematic view of an image capturing unit according to the 7th embodiment of the present disclosure. FIG. 17 shows, in order from left to right, spherical aberration curves, astigmatic field curves and a distortion curve of the image capturing unit according to the 7th embodiment. In FIG. 16, the image capturing unit includes the optical imaging system (its reference numeral is omitted) of the present disclosure and an image sensor 760. The optical imaging system includes, in order from an object side to an image side, a first lens element 710, an aperture stop 700, a second lens element 720, a third lens element 730, a filter 740 and an image surface 750, wherein the optical imaging system has a total of three lens elements (710-730) with refractive power.

The first lens element 710 with positive refractive power has an object-side surface 711 being convex in a paraxial region thereof and an image-side surface 712 being convex in a paraxial region thereof. The first lens element 710 is made of plastic material, and has the object-side surface 711 and the image-side surface 712 being both aspheric.

The second lens element 720 with positive refractive power has an object-side surface 721 being concave in a paraxial region thereof and an image-side surface 722 being convex in a paraxial region thereof. The second lens element 720 is made of plastic material, and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material, and has the object-side surface 731 and the image-side surface 732 being both aspheric. The image-side surface 732 of the third lens element 730 has at least one convex shape in an off-axis region thereof.

The filter 740 is made of glass and located between the third lens element 730 and the image surface 750, and will not affect the focal length of the optical imaging system. The image sensor 760 is disposed on or near the image surface 750 of the optical imaging system.

In the 7th embodiment, the second lens element 720 is made of visible-light-absorbing material for absorbing visible light. The first lens element 710, the third lens element 730 and the filter 740 are not made of visible-light-absorbing material so as to allow the visible light to pass through the first lens element 710, the third lens element 730 and the filter 740. Therefore, the second lens element 720 is for absorbing the incident light in a wavelength range of 400 nm to 700 nm (the visible light spectrum) so that the optical imaging system is favorable for being properly operated at a wavelength of 810 nm.

The detailed optical data of the 7th embodiment are shown in Table 13 and the aspheric surface data are shown in Table 14 below.

TABLE 13

7th Embodiment
f = 2.36 mm, Fno = 2.40, HFOV = 28.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.510 | (ASP) | 0.850 | Plastic | 1.570 | 30.2 | 2.17 |
| 2 | | −5.516 | (ASP) | 0.020 | | | | |
| 3 | Ape. Stop | Plano | | 0.391 | | | | |
| 4 | Lens 2 | −0.885 | (ASP) | 0.408 | Plastic | 1.570 | 30.2 | 1.44 |
| 5 | | −0.497 | (ASP) | 0.035 | | | | |
| 6 | Lens 3 | 29.270 | (ASP) | 0.300 | Plastic | 1.570 | 30.2 | −1.30 |
| 7 | | 0.719 | (ASP) | 0.400 | | | | |
| 8 | Filter | Plano | | 0.210 | Glass | 1.511 | 64.2 | — |
| 9 | | Plano | | 0.468 | | | | |
| 10 | Image | Plano | | — | | | | |

Note:
Reference wavelength is 810 nm.

TABLE 14

Aspheric Coefficients

| Surface # | 1 | 2 | 4 |
|---|---|---|---|
| k = | −3.0780E−01 | 2.8399E+00 | −3.2032E+00 |
| A4 = | −9.8572E−02 | −1.5837E−01 | −6.9751E−01 |
| A6 = | 5.1387E−02 | −1.1279E+00 | −5.4653E+00 |
| A8 = | −2.6114E−01 | 7.0505E+00 | 7.3725E+01 |
| A10 = | 8.8374E−02 | −1.3679E+01 | −3.6506E+02 |
| A12 = | — | — | 1.1721E+03 |
| A14 = | — | — | −1.7678E+03 |

| Surface # | 5 | 6 | 7 |
|---|---|---|---|
| k = | −5.5086E+00 | 9.0000E+01 | −1.2226E+01 |
| A4 = | −4.5776E+00 | −3.4541E+00 | −9.7885E−01 |
| A6 = | 3.6716E+01 | 2.6975E+01 | 2.9724E+00 |
| A8 = | −1.8716E+02 | −1.3154E+02 | −6.5290E+00 |
| A10 = | 5.7319E+02 | 3.9706E+02 | 8.0341E+00 |
| A12 = | −8.6214E+02 | −7.0866E+02 | −4.2567E+00 |
| A14 = | 4.8177E+02 | 6.8456E+02 | −4.8640E−01 |
| A16 = | — | −2.7542E+02 | 9.7757E−01 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.36 | ΣCT/CT1 | 1.83 |
| Fno | 2.40 | T12/T23 | 11.74 |
| HFOV [deg.] | 28.6 | f1/R2 | −0.39 |
| N2 + N3 | 3.140 | (|f3|/f2) + (f2/f1) | 1.57 |
| V2 + V3 | 60.40 | TD [mm] | 2.00 |
| V2/V3 | 1.00 | SD/TD | 0.57 |
| CT1/CT3 | 2.83 | TL/EPD | 3.14 |

8th Embodiment

Figure 18:
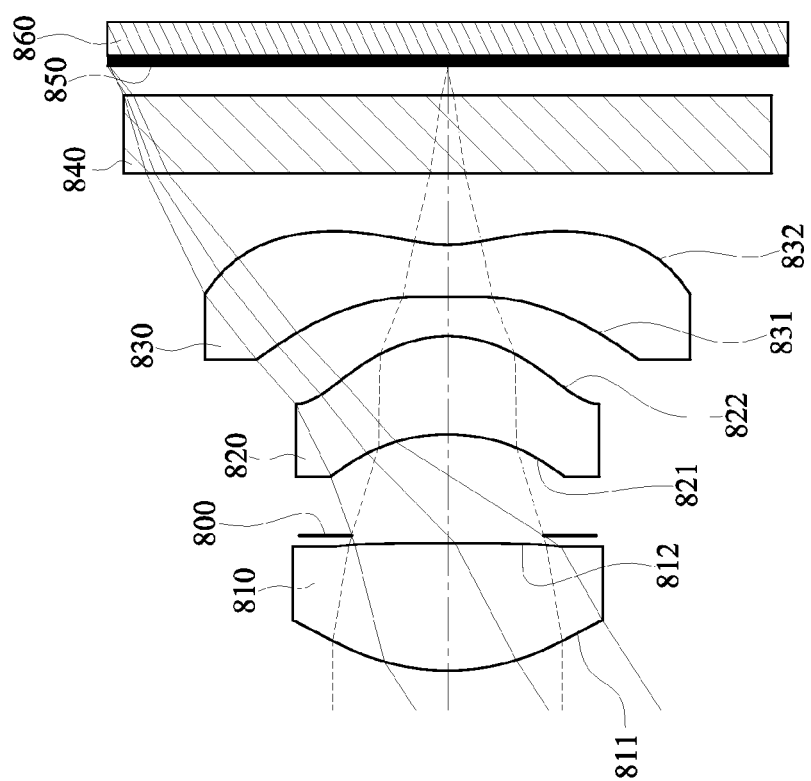
FIG. 18 is a schematic view of an image capturing unit according to the 8th embodiment of the present disclosure.

FIG. 18 is a schematic view of an image capturing unit according to the 8th embodiment of the present disclosure.

Figure 19:
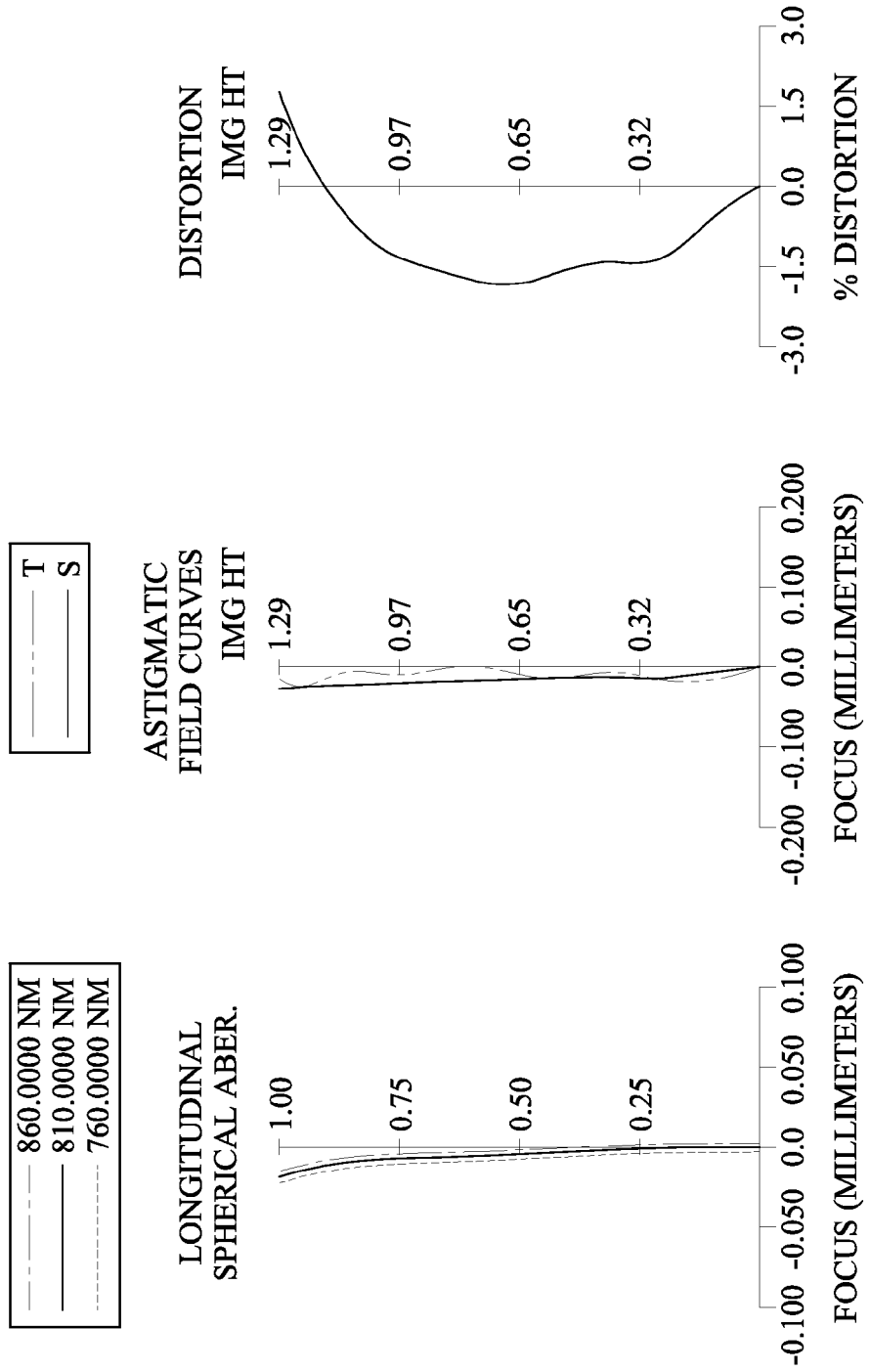
FIG. 19 shows spherical aberration curves, astigmatic field curves and a distortion curve of the image capturing unit according to the 8th embodiment.
Figure 21:
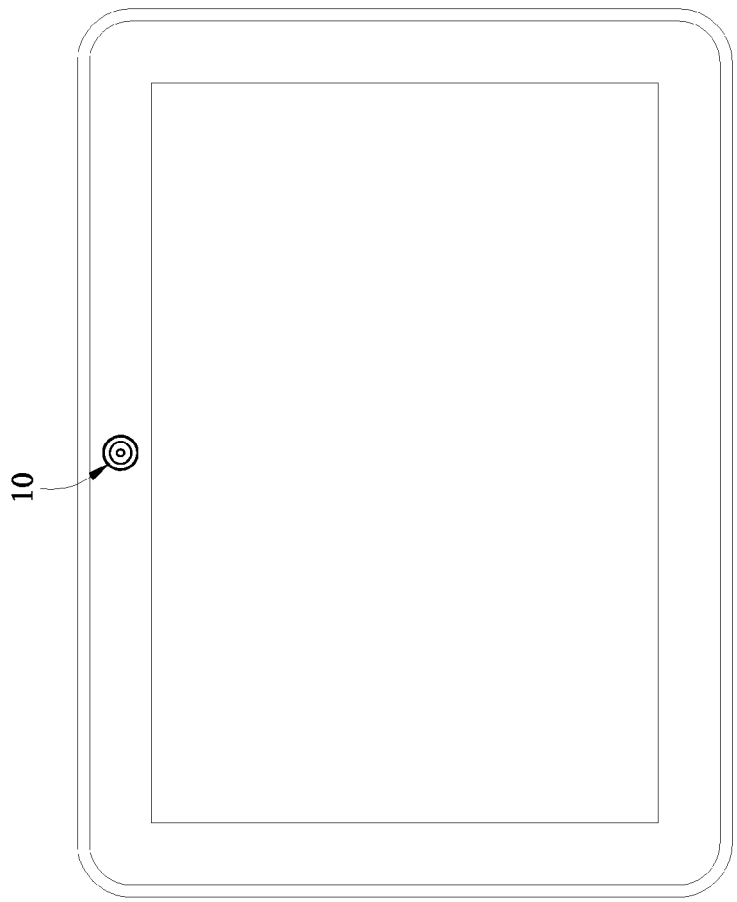
FIG. 21 shows an electronic device according to another embodiment.
Figure 20:
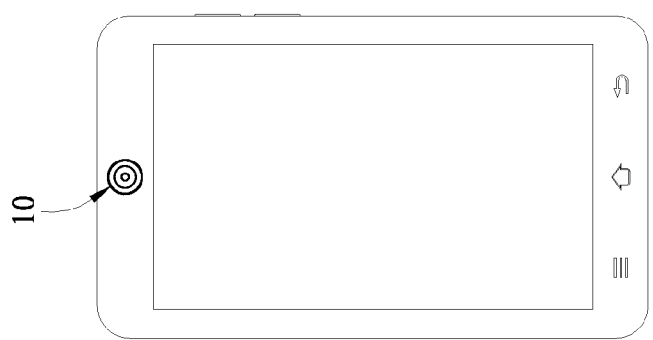
FIG. 20 shows an electronic device according to one embodiment.
Figure 22:
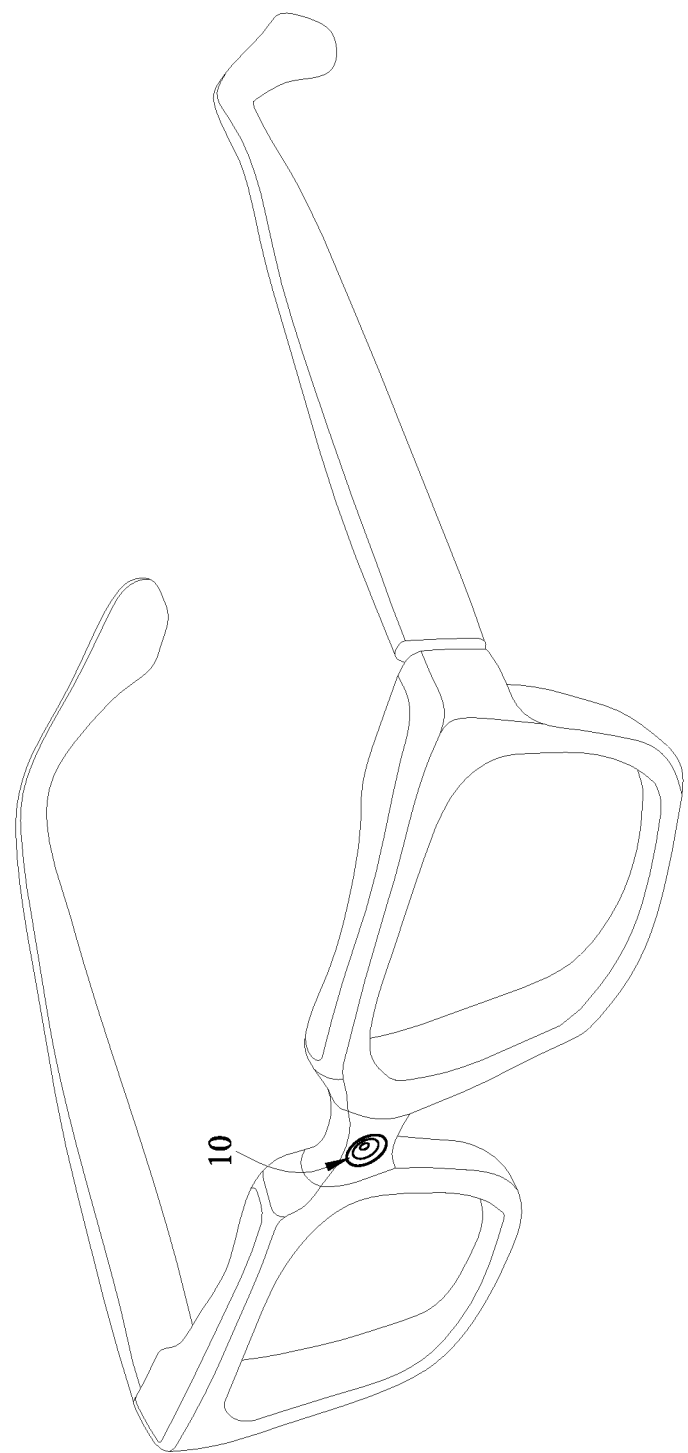
FIG. 22 shows an electronic device according to still another embodiment.

FIG. 19 shows, in order from left to right, spherical aberration curves, astigmatic field curves and a distortion curve of the image capturing unit according to the 8th embodiment. In FIG. 18, the image capturing unit includes the optical imaging system (its reference numeral is omitted) of the present disclosure and an image sensor 860. The optical imaging system includes, in order from an object side to an image side, a first lens element 810, an aperture stop 800, a second lens element 820, a third lens element 830, a filter 840 and an image surface 850, wherein the optical imaging system has a total of three lens elements (810-830) with refractive power.

The first lens element 810 with positive refractive power has an object-side surface 811 being convex in a paraxial region thereof and an image-side surface 812 being convex in a paraxial region thereof. The first lens element 810 is made of plastic material, and has the object-side surface 811 and the image-side surface 812 being both aspheric.

The second lens element 820 with positive refractive power has an object-side surface 821 being concave in a paraxial region thereof and an image-side surface 822 being convex in a paraxial region thereof. The second lens element 820 is made of plastic material, and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material, and has the object-side surface 831 and the image-side surface 832 being both aspheric. The image-side surface 832 of the third lens element 830 has at least one convex shape in an off-axis region thereof.

The filter 840 is made of plastic and located between the third lens element 830 and the image surface 850, and will not affect the focal length of the optical imaging system. The image sensor 860 is disposed on or near the image surface 850 of the optical imaging system.

In the 8th embodiment, the filter 840 is made of visible-light-absorbing material for absorbing visible light. The first lens element 810, the second lens element 820 and the third lens element 830 are not made of visible-light-absorbing material so as to allow the visible light to pass through the first lens element 810, the second lens element 820 and the third lens element 830. Therefore, the filter 840 is for absorbing the incident light in a wavelength range of 400 nm to 700 nm (the visible light spectrum) so that the optical imaging system is favorable for being properly operated at a wavelength of 810 nm.

The detailed optical data of the 8th embodiment are shown in Table 15 and the aspheric surface data are shown in Table 16 below.

TABLE 15

8th Embodiment
f = 1.97 mm, Fno = 2.25, HFOV = 33.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 0.851 | (ASP) | 0.486 | Plastic | 1.507 | 56.8 | 1.67 |
| 2 | | −97.921 | (ASP) | 0.029 | | | | |
| 3 | Ape. Stop | Plano | | 0.385 | | | | |
| 4 | Lens 2 | −0.767 | (ASP) | 0.375 | Plastic | 1.570 | 30.2 | 1.55 |
| 5 | | −0.484 | (ASP) | 0.149 | | | | |
| 6 | Lens 3 | 5.604 | (ASP) | 0.200 | Plastic | 1.615 | 23.4 | −1.01 |
| 7 | | 0.553 | (ASP) | 0.270 | | | | |
| 8 | Filter | Plano | | 0.300 | Plastic | 1.570 | 30.2 | — |
| 9 | | Plano | | 0.109 | | | | |
| 10 | Image | Plano | | — | | | | |

Note:
Reference wavelength is 810 nm.

TABLE 16

Aspheric Coefficients

| Surface # | 1 | 2 | 4 |
|---|---|---|---|
| k = | −7.0344E−02 | −9.0000E+01 | −6.6076E+00 |
| A4 = | −1.7581E−01 | −2.2401E−01 | −1.9018E+00 |
| A6 = | 6.0806E−01 | −4.3152E−01 | −1.8886E+01 |
| A8 = | −5.1866E+00 | −3.0812E+00 | 3.1337E+02 |
| A10 = | 9.7123E+00 | 1.0331E+01 | −2.5527E+03 |
| A12 = | 4.3444E+00 | — | 1.3826E+04 |
| A14 = | −8.1166E+01 | — | −4.2587E+04 |
| A16 = | 1.0266E+02 | — | 5.3537E+04 |

| Surface # | 5 | 6 | 7 |
|---|---|---|---|
| k = | −3.4153E+00 | −1.7713E+01 | −1.2526E+01 |
| A4 = | −2.5529E+00 | −5.4677E+00 | −1.6984E+00 |
| A6 = | 1.1223E+01 | 3.2609E+01 | 4.6550E+00 |
| A8 = | −5.4473E+01 | −1.3676E+02 | −7.5270E+00 |
| A10 = | 2.2084E+02 | 3.9497E+02 | 3.1265E+00 |
| A12 = | −3.1587E+02 | −7.2324E+02 | 7.8870E+00 |
| A14 = | 1.8698E+01 | 7.3446E+02 | −1.1910E+01 |
| A16 = | 1.2883E+02 | −3.0926E+02 | 4.9157E+00 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.97 | ΣCT/CT1 | 2.18 |
| Fno | 2.25 | T12/T23 | 2.78 |
| HFOV [deg.] | 33.0 | f1/R2 | −0.02 |
| N2 + N3 | 3.185 | (|f3|/f2) + (f2/f1) | 1.58 |
| V2 + V3 | 53.60 | TD [mm] | 1.62 |
| V2/V3 | 1.29 | SD/TD | 0.68 |
| CT1/CT3 | 2.43 | TL/EPD | 2.64 |

The foregoing image capturing unit is able to be installed in, but not limited to, an electronic device, including smart phones, tablet personal computers, wearable apparatus and driving assist devices. According to the present disclosure, the optical imaging system has a total of three lens elements with refractive power. The first lens element has positive refractive power, the second lens element has positive refractive power and the third lens element has negative refractive power. When the refractive power of the third lens element is stronger than that of the first lens element and that of the second lens element, the lens elements are favorable for reducing the total track length and the back focal length of the optical imaging system. Furthermore, when specific conditions are satisfied, it is favorable for balancing the arrangement of the refractive powers of the lens elements so as to correct the aberration of the optical imaging system and reduce the sensitivity of the optical imaging system. Moreover, both the object-side surface and the image-side surface of the first lens element are convex in a paraxial region thereof so that it is favorable for effectively balancing the arrangement of the curvature of the first lens element, thereby it is favorable for preventing the object-side surface and the image-side surface of the first lens element from overly curved so as to avoid excessive aberration and reduce molding problems.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging system comprising, in order from an object side to an image side:
    a first lens element with positive refractive power having an object-side surface being convex in a paraxial region thereof and an image-side surface being convex in a paraxial region thereof, wherein both of the object-side surface and the image-side surface of the first lens element are aspheric, and the first lens element is made of plastic material;
    a second lens element with positive refractive power having an object-side surface being concave in a paraxial region thereof and an image-side surface being convex in a paraxial region thereof, wherein both of the object-side surface and the image-side surface of the second lens element are aspheric, and the second lens element is made of plastic material; and
    a third lens element with negative refractive power having an image-side surface being concave in a paraxial region thereof, wherein the image-side surface of the third lens element has at least one convex shape in an off-axis region thereof, both of an object-side surface and the image-side surface of the third lens element are aspheric, and the third lens element is made of plastic material;
    wherein the optical imaging system has a total of three lens elements with refractive power which are the first lens element, the second lens element and the third lens element, the optical imaging system further comprises a stop located between the image-side surface of the first lens element and the object-side surface of the second lens element;
    wherein a focal length of the first lens element is f1, a focal length of the second lens element is f2, a focal length of the third lens element is f3, a central thickness of the first lens element is CT1, a central thickness of the third lens element is CT3, an axial distance between the stop and the image-side surface of the third lens element is SD, an axial distance between the object-side surface of the first lens element and the image-side surface of the third lens element is TD, and the following conditions are satisfied:

$|f3|<f2<f1$;

$1.55<CT1/CT3$; and $0.55<SD/TD<0.80$.

2. The optical imaging system of claim 1, wherein an axial distance between the first lens element and the second lens element is T12, an axial distance between the second lens element and the third lens element is T23, and the following condition is satisfied:

$2.5<T12/T23$.

3. The optical imaging system of claim 2, wherein the central thickness of the first lens element is CT1, the central thickness of the third lens element is CT3, and the following condition is satisfied:

$1.80<CT1/CT3<4.50$.

4. The optical imaging system of claim 2, wherein a sum of central thicknesses of the first lens element, the second lens element and the third lens element is ΣCT, the central thickness of the first lens element is CT1, and the following condition is satisfied:

$1.40<\Sigma CT/CT1<2.60$.

5. The optical imaging system of claim 1, wherein the central thickness of the first lens element is CT1, the central thickness of the third lens element is CT3, and the following condition is satisfied:

$2.40<CT1/CT3<3.50$.

6. The optical imaging system of claim 1, wherein the third lens element has an object-side surface being concave in a paraxial region thereof.

7. The optical imaging system of claim 1, wherein an Abbe number of the second lens element is V2, an Abbe number of the third lens element is V3, and the following condition is satisfied:

$0.80<V2/V3<1.33$.

8. The optical imaging system of claim 1, wherein the axial distance between the object-side surface of the first lens element and the image-side surface of the third lens element is TD, and the following condition is satisfied:

$TD<2.25$ millimeters (mm).

9. The optical imaging system of claim 1, wherein an Abbe number of the second lens element is V2, an Abbe number of the third lens element is V3, and the following condition is satisfied:

$V2+V3<70$.

10. The optical imaging system of claim 1, wherein a refractive index of the second lens element is N2, a refractive index of the third lens element is N3, and the following condition is satisfied:

$3.00<N2+N3<3.40$.

11. The optical imaging system of claim 1, wherein an axial distance between the object-side surface of the first lens element and an image surface is TL, an entrance pupil diameter of the optical imaging system is EPD, and the following condition is satisfied:

$1.0<TL/EPD<3.4$.

12. The optical imaging system of claim 1, wherein the focal length of the first lens element is f1, the focal length of the second lens element is f2, the focal length of the third lens element is f3, and the following condition is satisfied:

$1.25<(|f3|/f2)+(f2/f1)<1.85$.

13. The optical imaging system of claim 12, wherein the focal length of the first lens element is f1, a curvature radius of the image-side surface of the first lens element is R2, and the following condition is satisfied:

$$-1.5 < f1/R2 < 0.$$

14. The optical imaging system of claim 1, wherein the optical imaging system is for being operated within a wavelength range of 750 nanometers (nm) to 1050 nm.

15. The optical imaging system of claim 1, further comprising a filter, wherein at least one of the first lens element, the second lens element, the third lens element and the filter is made of visible-light-absorbing material.

16. An image capturing unit, comprising:
   the optical imaging system of claim 1; and
   an image sensor, wherein the image sensor is disposed on the image side of the optical imaging system.

17. An electronic device comprising:
   the image capturing unit of claim 16.

18. An optical imaging system comprising, in order from an object side to an image side:
   a first lens element with positive refractive power having an object-side surface being convex in a paraxial region thereof and an image-side surface being convex in a paraxial region thereof, wherein both of the object-side surface and the image-side surface of the first lens element are aspheric, and the first lens element is made of plastic material;
   a second lens element with positive refractive power having an object-side surface being concave in a paraxial region thereof and an image-side surface being convex in a paraxial region thereof, wherein both of the object-side surface and the image-side surface of the second lens element are aspheric, and the second lens element is made of plastic material; and
   a third lens element with negative refractive power having an image-side surface being concave in a paraxial region thereof, wherein the image-side surface of the third lens element has at least one convex shape in an off-axis region thereof, both of an object-side surface and the image-side surface of the third lens element are aspheric, and the third lens element is made of plastic material;
   wherein the optical imaging system has a total of three lens elements with refractive power which are the first lens element, the second lens element and the third lens element, the optical imaging system further comprises a filter, and at least one of the first lens element, the second lens element, the third lens element and the filter is made of visible-light-absorbing material;
   wherein a focal length of the first lens element is f1, a focal length of the second lens element is f2, a focal length of the third lens element is f3, a central thickness of the first lens element is CT1, a central thickness of the third lens element is CT3, and the following conditions are satisfied:

$$|f3| < f2 < f1; \text{ and}$$

$$1.25 < CT1/CT3.$$

19. The optical imaging system of claim 18, wherein the central thickness of the first lens element is CT1, the central thickness of the third lens element is CT3, and the following condition is satisfied:

$$1.55 < CT1/CT3.$$

20. The optical imaging system of claim 18, wherein an axial distance between the object-side surface of the first lens element and the image-side surface of the third lens element is TD, and the following condition is satisfied:

$$TD < 2.25 \text{ millimeters (mm)}.$$

21. The optical imaging system of claim 18, wherein an Abbe number of the second lens element is V2, an Abbe number of the third lens element is V3, and the following condition is satisfied:

$$V2 + V3 < 70.$$

22. The optical imaging system of claim 18, wherein an axial distance between the object-side surface of the first lens element and an image surface is TL, an entrance pupil diameter of the optical imaging system is EPD, and the following condition is satisfied:

$$1.0 < TL/EPD < 3.4.$$

23. The optical imaging system of claim 18, wherein a sum of central thicknesses of the first lens element, the second lens element and the third lens element is ΣCT, the central thickness of the first lens element is CT1, and the following condition is satisfied:

$$1.40 < \Sigma CT/CT1 < 2.60.$$

24. An image capturing unit, comprising:
   the optical imaging system of claim 18; and
   an image sensor, wherein the image sensor is disposed on the image side of the optical imaging system.

25. An electronic device comprising:
   the image capturing unit of claim 24.

* * * * *